US012106410B2

(12) United States Patent
Wang et al.

(10) Patent No.: US 12,106,410 B2
(45) Date of Patent: Oct. 1, 2024

(54) CUSTOMIZING EMOJIS FOR USERS IN CHAT APPLICATIONS

(71) Applicant: BEIJING ZITIAO NETWORK TECHNOLOGY CO., LTD., Beijing (CN)

(72) Inventors: Xingyi Wang, Beijing (CN); Zhou Yu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/355,873

(22) Filed: Jul. 20, 2023

(65) Prior Publication Data
US 2023/0410394 A1    Dec. 21, 2023

Related U.S. Application Data

(63) Continuation of application No. PCT/CN2022/071150, filed on Jan. 11, 2022.

(30) Foreign Application Priority Data

Jan. 22, 2021   (CN) .......................... 202110088297.1

(51) Int. Cl.
*G06T 11/60*   (2006.01)
*G06F 3/04817*   (2022.01)
(Continued)

(52) U.S. Cl.
CPC .......... *G06T 11/60* (2013.01); *G06F 3/04817* (2013.01); *G06F 3/0487* (2013.01);
(Continued)

(58) Field of Classification Search
CPC .... G06F 3/04817; G06F 3/0487; G06F 9/451; G06F 16/535; G06F 16/538; G06T 11/60; H04L 51/04
See application file for complete search history.

(56) References Cited

U.S. PATENT DOCUMENTS 10,303,746 B1* 5/2019 Periasamy .............. B60R 13/10
2013/0159919 A1* 6/2013 Leydon ............... G06F 3/04886
715/780

(Continued)

FOREIGN PATENT DOCUMENTS

CN      101183294 A     5/2008
CN      105608715 A     5/2016
(Continued)

OTHER PUBLICATIONS

Office Action issued in corresponding Chinese Application No. 202110088297.1, issued Aug. 21, 2023, with English translation.
(Continued)

*Primary Examiner* — Eric J. Bycer
(74) *Attorney, Agent, or Firm* — HSML P.C.

(57) ABSTRACT

An image display method, a device, and a medium. The image display method includes displaying an emoji recommendation panel in a chat interface once an input text displayed in the chat interface triggers an emoji recommendation event, in which a target entry icon is displayed in the emoji recommendation panel, and the target entry icon is used to trigger display of a custom target emoji image; stopping displaying the emoji recommendation panel in response to detecting a first trigger operation on the target entry icon; and displaying, in the chat interface, a target emoji presentation panel corresponding to the target entry icon. A first preview image is displayed in the target emoji (Continued)

presentation panel, and the first preview image is a preview image of the target emoji image.

16 Claims, 14 Drawing Sheets

(51) Int. Cl.
    *G06F 3/0487*     (2013.01)
    *G06F 9/451*     (2018.01)
    *G06F 16/535*     (2019.01)
    *G06F 16/538*     (2019.01)
    *H04L 51/04*     (2022.01)

(52) U.S. Cl.
    CPC ............ *G06F 9/451* (2018.02); *G06F 16/535* (2019.01); *G06F 16/538* (2019.01); *H04L 51/04* (2013.01)

(56) References Cited

U.S. PATENT DOCUMENTS

| | | | |
|---|---|---|---|
| 2015/0286371 A1 | 10/2015 | Degani | |
| 2016/0050169 A1* | 2/2016 | Ben Atar | G06F 3/04817 709/206 |
| 2017/0018289 A1* | 1/2017 | Morgenstern | G11B 27/34 |
| 2017/0046065 A1* | 2/2017 | Zeng | G06F 3/012 |
| 2017/0075878 A1* | 3/2017 | Jon | H04M 1/72436 |
| 2017/0140214 A1* | 5/2017 | Matas | G06V 40/174 |
| 2017/0185581 A1* | 6/2017 | Bojja | G06V 30/19173 |
| 2017/0277277 A1 | 9/2017 | Li et al. | |
| 2018/0077543 A1* | 3/2018 | Cho | G06Q 30/02 |
| 2018/0083898 A1* | 3/2018 | Pham | H04L 51/046 |
| 2018/0205681 A1* | 7/2018 | Gong | H04L 51/222 |
| 2018/0367484 A1 | 12/2018 | Rodriguez et al. | |
| 2019/0207903 A1 | 7/2019 | Deac | |
| 2020/0244605 A1 | 7/2020 | Nagaraja et al. | |
| 2021/0158594 A1* | 5/2021 | Huang | H04N 9/8227 |
| 2023/0066716 A1 | 3/2023 | Zhang | |

FOREIGN PATENT DOCUMENTS

| | | | |
|---|---|---|---|
| CN | 105700703 | A | 6/2016 |
| CN | 106331529 | A | 1/2017 |
| CN | 106875460 | A | 6/2017 |
| CN | 108038102 | A | 5/2018 |
| CN | 108227956 | A | 6/2018 |
| CN | 108388557 | A | 8/2018 |
| CN | 109120866 | A | 1/2019 |
| CN | 109215007 | A | 1/2019 |
| CN | 109948093 | A | 6/2019 |
| CN | 110458916 | A | 11/2019 |
| CN | 111541950 | A | 8/2020 |
| CN | 111726536 | A | 9/2020 |
| CN | 111756917 | A | 10/2020 |
| CN | 111966804 | A | 11/2020 |
| CN | 112131422 | A | 12/2020 |
| CN | 112199032 | A | 1/2021 |
| CN | 112532507 | A | 3/2021 |
| CN | 113342435 | A | 9/2021 |
| JP | 2015507791 | A | 3/2015 |
| JP | 2017152021 | A | 8/2017 |
| WO | 2020226270 | A1 | 11/2020 |

OTHER PUBLICATIONS

Baidu experience, "How to match facial expressions in wechat", available at https://jingyan.baidu.com/article/77b8dc7f25c6472075eab640.html, Apr. 24, 2020, with English translation.

International Search Report (with English translation) and Written Opinion issued in PCT/CN2022/071150, dated Mar. 18, 2022, 14 pages provided.

Notification to Grant issued in CN202110088297.1, dated Jan. 24, 2024, with English translation, 8 pages provided.

Office Action issued in Japanese Application No. 2023-544244, dated Aug. 6, 2024, with machine translation.

* cited by examiner

CUSTOMIZING EMOJIS FOR USERS IN CHAT APPLICATIONS

This application is a continuation application of International Application No. PCT/CN2022/071150, filed on Jan. 11, 2022, which claims priority to Chinese Patent Application No. 202110088297.1, titled "IMAGE DISPLAY METHOD AND APPARATUS, DEVICE, AND MEDIUM", filed on Jan. 22, 2021 with the China National Intellectual Property Administration, both of which are incorporated herein by reference in their entireties.

FIELD

The present disclosure relates to the technical field of image processing, and, in particular, to an image display method, apparatus, and device, and a medium.

BACKGROUND

With the popularity of social media, people are no longer satisfied with simple communication through text, voice or the like, a more interesting medium is needed to enrich their social activities, and therefore a variety of emoji images have been created. As a result, users are more inclined to use custom emoji images for social activities.

At present, when a user wants to send a custom emoji image, the user needs to perform a series of tedious operations to find a custom emoji image, resulting in a cumbersome operation for the user to find the custom emoji image and degrading the user experience.

SUMMARY

In order to solve or at least partially solve the above technical problems, an image display method, apparatus and device and a medium are provided according to the present disclosure.

In a first aspect, an image display method is provided according to the present disclosure. The image display method includes:
  displaying an emoji recommendation panel in a chat interface, once an input text displayed in the chat interface triggers an emoji recommendation event, where a target entry icon is displayed in the emoji recommendation panel, and the target entry icon is used to trigger the display of a custom target emoji image;
  stopping displaying the emoji recommendation panel, in response to detecting a first trigger operation on the target entry icon; and
  displaying, in the chat interface, a target emoji presentation panel corresponding to the target entry icon, where a first preview image is displayed in the target emoji presentation panel, and the first preview image is a preview image of the target emoji image.

In a second aspect, an image display apparatus is provided according to the present disclosure. The image display apparatus includes:
  a first display unit, configured to display an emoji recommendation panel in a chat interface, once an input text displayed in the chat interface triggers an emoji recommendation event, where a target entry icon is displayed in the emoji recommendation panel, and the target entry icon is used to trigger the display of a custom target emoji image;
  a second display unit, configured to stop displaying the emoji recommendation panel, in response to detecting a first trigger operation on the target entry icon; and
  a third display unit, configured to display, in the chat interface, a target emoji presentation panel corresponding to the target entry icon, where a first preview image is displayed in the target emoji presentation panel, and the first preview image is a preview image of the target emoji image.

In a third aspect, an image display device is provided according to the present disclosure. The image display device includes:
  a processor; and
  a memory configured to store executable instructions;
  where, the processor is configured to read the executable instructions from the memory, and execute the executable instructions to implement the image display method according to the first aspect.

In a fourth aspect, a computer-readable storage medium having a computer program stored thereon is provided according to the present disclosure, where the computer program, when being executed by a processor, causes the processor to implement the image display method according to the first aspect.

Technical solutions according to embodiments of the present disclosure have the following advantages over conventional technology.

With the image display method, apparatus and device and the medium according to embodiments of the present disclosure, once the input text displayed in the chat interface triggers the emoji recommendation event, the emoji recommendation panel may be displayed in the chat interface. The emoji recommendation panel may include the target entry icon for triggering the display of the custom target emoji image. The display of the emoji recommendation panel may be stopped in response to detecting the first trigger operation on the target entry icon. In addition, the target emoji presentation panel corresponding to the target entry icon may be displayed in the chat interface, where a preview image of the target emoji image may be displayed in the target emoji presentation panel. Therefore, once the input text triggers the emoji recommendation event, the user can quickly access, directly through the target entry icon displayed in the emoji recommendation panel, the target emoji presentation panel in which the preview image of the target emoji image is displayed, thereby improving the convenience of finding the custom emoji image by the user, simplifying the operation for the user to find the custom emoji image, and thus enhancing the user experience.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the originals and elements are not necessarily drawn to scale.

DETAILED DESCRIPTION OF EMBODIMENTS

Figure 1:
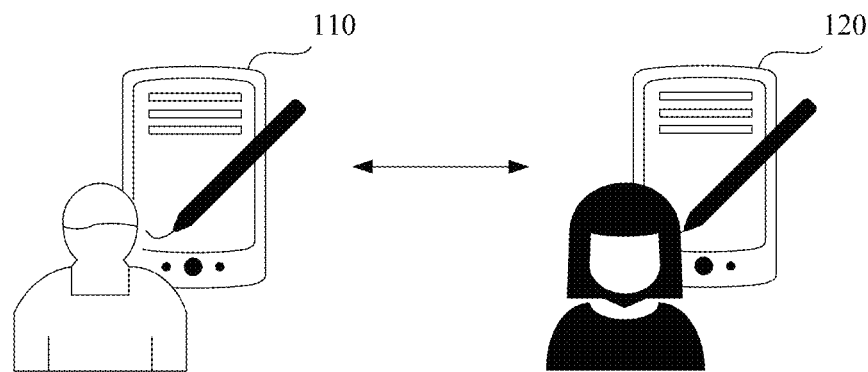
FIG. 1 is an architectural diagram for displaying an image according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

Figure 2:
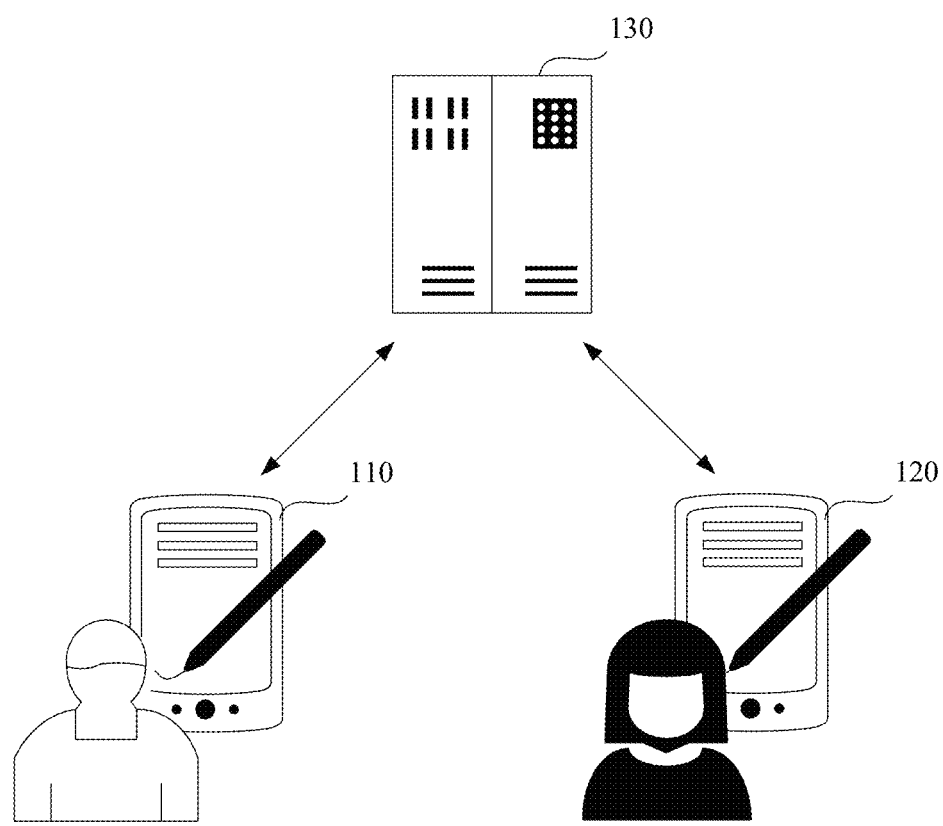
FIG. 2 is an architectural diagram for displaying an image according to another embodiment of the present disclosure.

The image display method according to the present disclosure may be applied in the architectures shown in FIG. 1 and FIG. 2, specifically described in detail in conjunction with FIG. 1 and FIG. 2.

FIG. 1 illustrates an architectural diagram for displaying an image according to an embodiment of the present disclosure.

As shown in FIG. 1, the image display architecture may include at least one first electronic device 110 and at least one second electronic device 120 at client end. The first electronic device 110 may establish a connection and perform information exchange with the second electronic device 120 via a network protocol such as Hyper Text Transfer Protocol over Secure Socket Layer (HTTPS). The first electronic device 110 and the second electronic device 120 may each include a mobile phone, a tablet computer, a desktop computer, a laptop computer, a vehicle-mounted terminal, a wearable electronic device, an all-in-one machine, a smart home device, and other devices with communication functions, or a device that is simulated by a virtual machine or an emulator.

Based on the above architecture, a first user using the first electronic device 110 and a second user using the second electronic device 120 may perform a chat in respective chat interfaces, belonging to a predetermined platform, displayed by the first electronic device 110 and the at least one second electronic device 120. The predetermined platform may have an instant messaging function. Optionally, the predetermined platform may be a predetermined website or a predetermined application.

When the first user enters, in the chat interface, input text to be sent to the second user, once the input text displayed in the chat interface triggers an emoji recommendation event, an emoji recommendation panel may be displayed in the chat interface. A target entry icon for triggering displaying of custom target emoji images may be displayed in the emoji recommendation panel; the display of the emoji recommendation panel may be stopped, in response to detecting a first trigger operation performed by the first user on the target entry icon; and the target emoji presentation panel corresponding to the target entry icon may be displayed in the chat interface. The target emoji presentation panel may display a first preview image, where the first preview image may be a preview image of the target emoji image.

Therefore, once the input text triggers the emoji recommendation event, the user can quickly access, directly through the target entry icon displayed in the emoji recommendation panel, the target emoji presentation panel in which the preview image of the target emoji image is displayed, and the custom target emoji image can be found without cumbersome operation of the user, thereby improving the convenience of finding the custom target emoji image by the user, simplifying the operation for the user to find the custom target emoji image, and thus enhancing the user experience.

Further, the image display method according to the embodiments of the present disclosure may be applied in an architecture including an electronic device and a server, in addition to the above architecture including multiple electronic devices, as illustrated specifically in conjunction with FIG. 2.

FIG. 2 illustrates an architectural diagram for displaying an image according to another embodiment of the present disclosure.

As shown in FIG. 2, the image display architecture may include at least one first electronic device 110 and at least one second electronic device 120 at client end, and at least one server 130 at server end. The first electronic device 110 and the second electronic device 120 may establish a connection and perform information interaction with the server 130 via a network protocol such as HTTPS, and the first electronic device 110 and the second electronic device 120 may communicate with each other via the server 130. The first electronic device 110 and the second electronic device 120 may each include a mobile phone, a tablet computer, a desktop computer, a laptop computer, a vehicle-mounted terminal, a wearable electronic device, an all-in-one machine, a smart home device, and other devices with communication functions, or a device that is simulated by a virtual machine or an emulator. The server 130 may be a device with storage and computing functions such as a cloud server or a server cluster.

Based on the above architecture, a first user using the first electronic device 110 and a second user using the second electronic device 120 may perform a chat in respective chat interfaces, belonging to a predetermined platform provided by the server 130, displayed by the first electronic device 110 and the at least one second electronic device 120. The predetermined platform may have an instant messaging function. Optionally, the predetermined platform may be a predetermined website or a predetermined application.

Before the first user enters, in the chat interface, the input text to be sent to the second user, the first electronic device 110 may obtain the custom target emoji image sent by the server 130.

When the first user enters, in the chat interface, input text to be sent to the second user, once the input text displayed in the chat interface triggers an emoji recommendation event, an emoji recommendation panel may be displayed in the chat interface. A target entry icon for triggering displaying of custom target emoji images may be displayed in the emoji recommendation panel; the display of the emoji recommendation panel may be stopped, in response to detecting the first trigger operation performed by the first user on the target entry icon; and the target emoji presentation panel corresponding to the target entry icon may be displayed in the chat interface. The target emoji presentation panel may display a first preview image, where the first preview image may be a preview image of the target emoji image.

Therefore, the user may firstly obtain the target emoji image before entering the input text. After obtaining the target emoji image, once the input text triggers the emoji recommendation event, the user can quickly access, directly through the target entry icon displayed in the emoji recommendation panel, the target emoji presentation panel in which the preview image of the target emoji image is displayed, and the custom target emoji image can be found without cumbersome operation of the user, thereby improving the convenience of finding the custom target emoji image by the user, simplifying the operation for the user to find the custom target emoji image, and thus enhancing the user experience.

Based on the above architecture, the image display method according to the embodiments of the present disclosure is described below in conjunction with FIG. 3 to FIG. 14.

In an embodiment of the present disclosure, the image display method may be performed by an electronic device. In some embodiments, the electronic device may be the first electronic device 110 at client end, as shown in FIG. 1 and FIG. 2. The electronic device may include a mobile phone, a tablet computer, a desktop computer, a laptop computer, a vehicle-mounted terminal, a wearable device, an all-in-one computer, a smart home device, and other devices with communication functions, or a device that is simulated by a virtual machine or an emulator.

Figure 3:
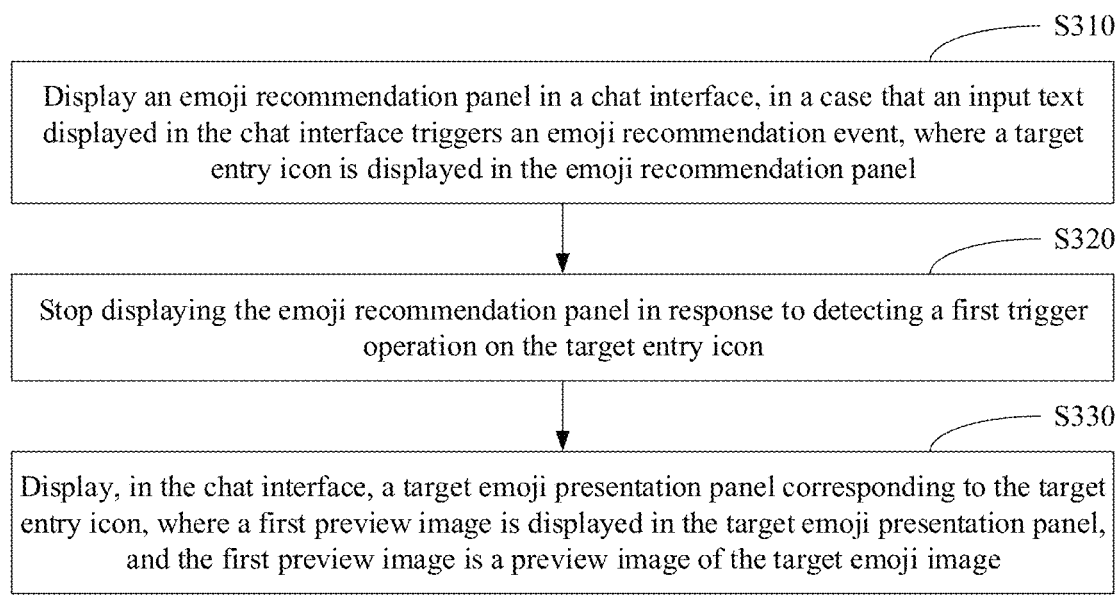
FIG. 3 is a schematic flowchart of an image display method according to an embodiment of the present disclosure.

FIG. 3 illustrates a schematic flowchart of an image display method according to an embodiment of the present disclosure.

As shown in FIG. 3, the image display method may include the following steps S310 to S330.

In S310, an emoji recommendation panel is displayed in a chat interface once an input text displayed in the chat interface triggers an emoji recommendation event, where a target entry icon is displayed in the emoji recommendation panel.

In an embodiment of the present disclosure, once the chat interface is displayed on the electronic device, the user may enter the input text in an input box of the chat interface. During the process of the user entering the input text, the electronic device may detect the input text in real time, and once it is detected that the input text triggers the emoji recommendation event, the emoji recommendation panel in which the target entry icon is presented may be displayed in the chat interface.

In some embodiments, the electronic device may obtain the input text in real time and input the input text into a pre-trained sentiment classification model to figure out the sentiment type corresponding to the input text. The sentiment type is used to indicate the sentiment to be expressed by the input text. The electronic device may then detect locally stored non-custom emoji images. Once an emoji image with the sentiment type corresponding to the input text is detected, the electronic device may determine that the input text triggers the emoji recommendation event, and display, in the chat interface, the emoji recommendation panel in which the target entry icon is presented.

In other embodiments, the electronic device may obtain the input text in real time and extract a sentiment keyword from the input text. The electronic device may then detect among locally stored image tags of non-custom emoji images. Once an emoji image with an image tag matching the sentiment keyword is detected, the electronic device may determine that the input text triggers the emoji recommendation event, and display, in the chat interface, the emoji recommendation panel in which the target entry icon is presented.

In an embodiment of the present disclosure, the emoji recommendation panel may be a container for storing the target entry icon, such that the emoji recommendation panel may display the target entry icon.

In some embodiments, the emoji recommendation panel may be displayed in an information display area of the chat interface. The information display area may be an area for displaying chat history. The chat history may include at least one of instant chat messages and historical chat messages.

Optionally, the emoji recommendation panel may be displayed in the information display area with being right-aligned and located on top of the input box.

Figure 4:
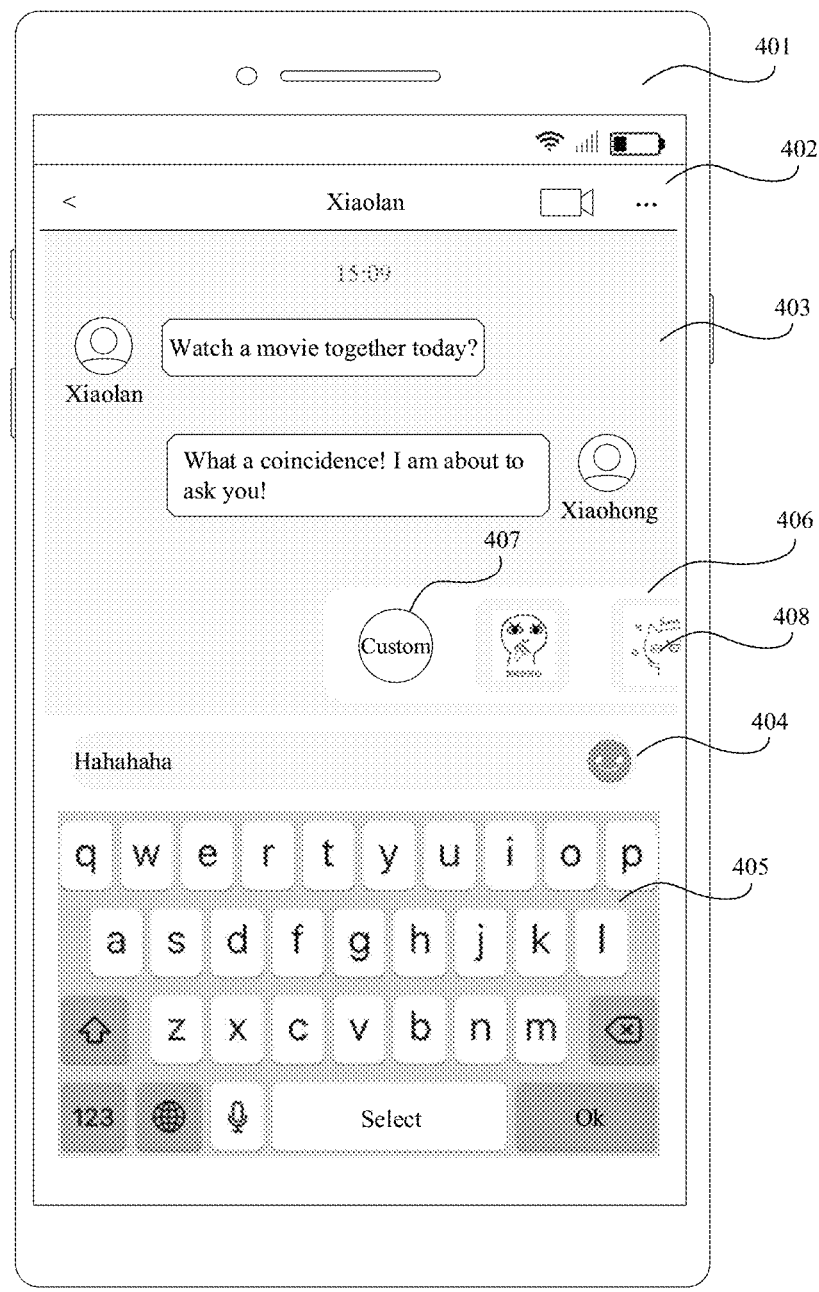
FIG. 4 is a schematic diagram of an emoji recommendation panel according to an embodiment of the present disclosure.

FIG. 4 illustrates a schematic diagram of an emoji recommendation panel according to an embodiment of the present disclosure.

As shown in FIG. 4, the electronic device 401 may display a chat interface 402 in which Xiaohong performs a chat with Xiaolan. An information display area 403, an input box 404, and a virtual keyboard control 405 are displayed in the chat interface 402. When Xiaohong enters the input text "hahahaha" in the input box 404, the electronic device determines that the input text "hahahaha" triggers an emoji recommendation event, and displays an emoji recommendation panel 406 in the information display area 403 above the input box 404 in right-aligned form. A target entry icon 407 corresponding to a custom emoji image may be displayed in the emoji recommendation panel 406.

In other embodiments, alternatively, the emoji recommendation panel may be displayed between an input box and a virtual keyboard control of the chat interface. The virtual keyboard control may be used for the user to enter the input text into the input box.

Specifically, the electronic device may additionally display an emoji recommendation panel display area between the input box and the virtual keyboard control, and display the emoji recommendation panel in the emoji recommendation panel display area.

Optionally, the emoji recommendation panel may be displayed between the input box and the virtual keyboard control with being aligned at both ends.

In an embodiment of the present disclosure, the target entry icon may be used to trigger the display of a custom target emoji image. Thus, the user may cause the electronic device to display a preview image of the target emoji image directly by triggering the target entry icon.

The emoji image is an image having a meaning expressing function that may reflect the inner activity, mood, emotion, or specific semantics of the user sending the emoji image.

The custom target emoji image may be a custom emoji image. Specifically, the target emoji image may be an emoji image that needs to be generated in combination with the user's own facial feature.

Optionally, the target emoji image may include at least one of static emoji image and dynamic emoji image.

Generally, the static emoji image may be a static picture, for example, the static emoji image may be an image in Portable Network Graphics (PNG) file format. The dynamic emoji image is an animated picture that is a composite of multiple static pictures, for example, a dynamic emoji image may be an image in Graphics Interchange Format (GIF) file format.

Step S320 is described hereinafter continually with reference to FIG. 3.

In S320, the display of the emoji recommendation panel is stopped, in response to detecting a first trigger operation on the target entry icon.

In an embodiment of the present disclosure, in a case that the emoji recommendation panel in which the target entry icon is presented is displayed in the chat interface, the user may perform a first trigger operation on the target entry icon.

The electronic device may detect the operation of the user on the chat interface in real time and stop displaying the emoji recommendation panel in response to detecting the first trigger operation on the target entry icon.

Optionally, the first trigger operation may be an operation such as a click, long press, double click on the target entry icon, which is not limited herein.

In some embodiments, in a case that the emoji recommendation panel is displayed in the information display area of the chat interface, the electronic device may simply stop displaying the emoji recommendation panel.

In other embodiments, in a case that the emoji recommendation panel is displayed between the input box and the virtual keyboard control of the chat interface, the electronic device may cancel the display of the emoji recommendation panel display area, thereby stopping displaying the emoji recommendation panel.

In step S330, a target emoji presentation panel corresponding to the target entry icon is displayed in the chat interface, where a first preview image is displayed in the target emoji presentation panel, and the first preview image is a preview image of the target emoji image.

In an embodiment of the present disclosure, after stopping displaying the emoji recommendation panel, the electronic device may display, in the chat interface, the target emoji presentation panel corresponding to the target entry icon.

Since the target entry icon is used to trigger the display of a custom target emoji image, the target emoji presentation panel may be a container for storing the target emoji image, such that the target emoji presentation panel may display the first preview image corresponding to the target emoji image.

In some embodiments, the target emoji presentation panel may be displayed on top of the virtual keyboard control and overlay the virtual keyboard control.

In other embodiments, alternatively, the target emoji presentation panel may be displayed in place of the virtual keyboard control.

It should be noted that there may be one or more target emoji images, which is not limited herein.

In an embodiment of the present disclosure, once the input text displayed in the chat interface triggers the emoji recommendation event, the emoji recommendation panel may be displayed in the chat interface. The emoji recommendation panel may include the target entry icon for triggering the display of the custom target emoji image. The display of the emoji recommendation panel may be stopped in response to detecting the first trigger operation on the target entry icon. The target emoji presentation panel corresponding to the target entry icon may be displayed in the chat interface, and a preview image of the target emoji image may be displayed in the target emoji presentation panel. Therefore, once the input text triggers the emoji recommendation event, the user can quickly access, directly through the target entry icon displayed in the emoji recommendation panel, the target emoji presentation panel in which the preview image of the target emoji image is displayed, thereby improving the convenience of finding the custom target emoji image by the user, simplifying the operation for the user to find the custom target emoji image, and thus enhancing the user experience.

In an embodiment of the present disclosure, upon detecting that the input text triggers the emoji recommendation event, the electronic device may, based on the emoji type of the custom emoji image stored locally by the electronic device, determine the target emoji image that may be displayed by the user directly triggering through the emoji recommendation panel, and then presents the target entry icon in the emoji recommendation panel, for triggering displaying of the custom target emoji images.

In some embodiments of the present disclosure, the chat interface may be an interface in which the first user performs a chat with the second user.

Accordingly, once a first emoji image is detected, the target emoji image may include the first emoji image. The first emoji image is generated based on a first face image of the first user and a second face image of the second user. That is, the first emoji image may be a custom emoji image of group photo including the first face image and the second face image, and the emoji type of the first emoji image is a group photo type.

Further, the target entry icon may be a first emoji entry icon, i.e. an entry icon to the custom emoji of group photo including the first face image and the second face image.

Further, the target emoji presentation panel may be a first emoji presentation panel, i.e. an emoji presentation panel for displaying the custom emoji image of group photo including the first face image and the second face image.

In some embodiments, the chat interface may be an interface in which the first user performs a chat with the second user.

In this case, the first emoji image may be a custom emoji image of group photo generated based on the first face image of the first user and the second face image of the second user.

In other embodiments, the chat interface may be an interface in which the first user performs a chat with multiple second users.

In this case, the first emoji image may be a custom emoji image of group photo generated based on the first face image of the first user and the second face images of all of the second users.

Figure 5:
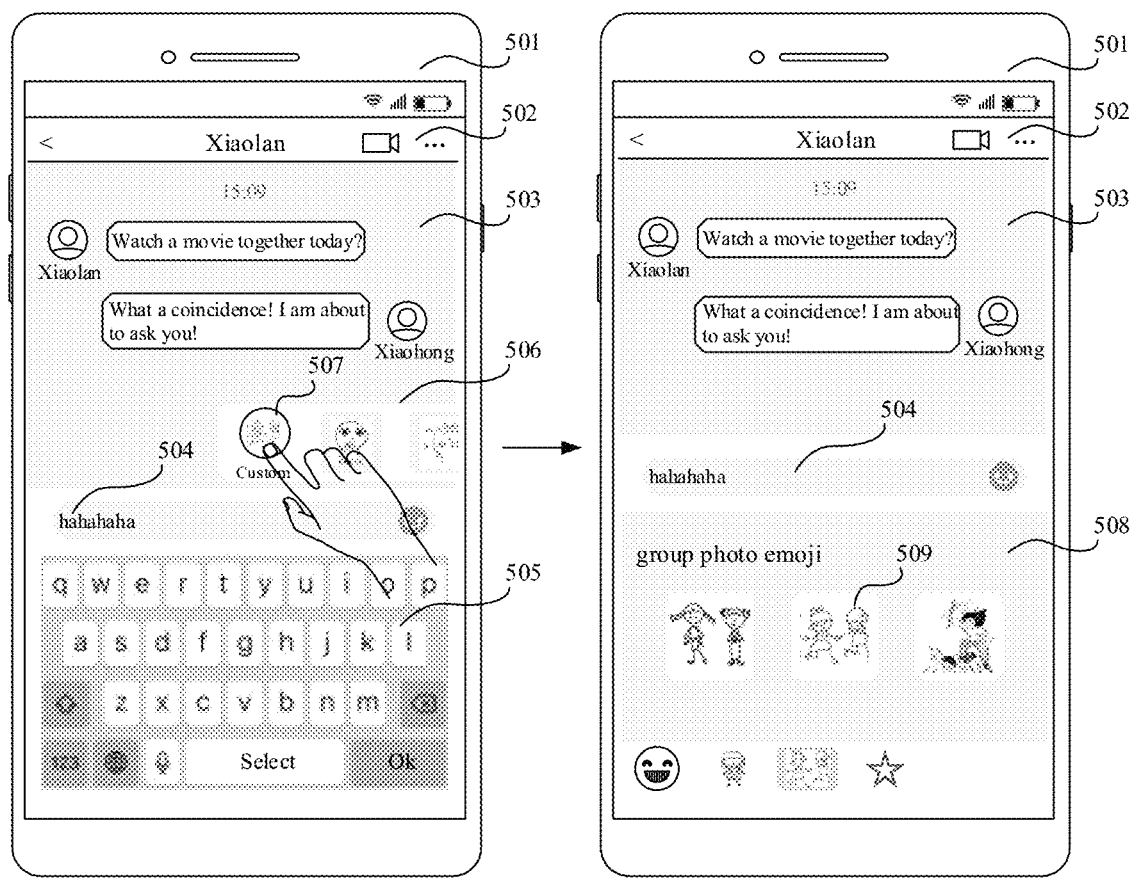
FIG. 5 is a schematic diagram of an entry triggering process according to an embodiment of the present disclosure.

FIG. 5 illustrates a schematic diagram of an entry triggering process according to an embodiment of the present disclosure.

As shown in FIG. 5, the electronic device 501 may display a chat interface 502 in which Xiaohong performs a chat with Xiaolan. An information display area 503, an input box 504, and a virtual keyboard control 505 are displayed in the chat interface 502. When Xiaohong enters the input text "hahahaha" in the input box 504, the electronic device determines that the input text "hahahaha" triggers an emoji recommendation event, and displays an emoji recommendation panel 506 in the information display area 503 above the input box 504 in right-aligned form. If the electronic device 501 detects the presence of a local custom emoji image of group photo of Xiaohong and Xiaolan, the emoji recommendation panel 506 may display an entry icon 507 corresponding to the custom emoji image of group photo. Xiaohong may click on the entry icon 507 to the custom emoji image of group photo. The electronic device, upon detecting a click operation on the entry icon 507, may replace the virtual keyboard control 505 with the emoji presentation panel 508 for the custom emoji image of group photo, and a preview image 509 for the custom emoji image of group photo may be displayed in the emoji presentation panel 508.

Thus, in an embodiment of the present disclosure, when a custom emoji image of group photo including chatting users in the current chat interface is stored in the electronic device, the entry icon to the custom emoji of group photo may be directly displayed to help the user quickly access the emoji presentation panel for the custom emoji image of group photo including chatting users in the current chat interface. And in a case that the user has many custom emoji images, usable custom emoji images are intelligently recommended for the user, further enhancing the user experience.

In an embodiment of the present disclosure, optionally, the electronic device generates a first emoji image before determining that the input text displayed in the chat interface triggers the emoji recommendation event.

Figure 6:
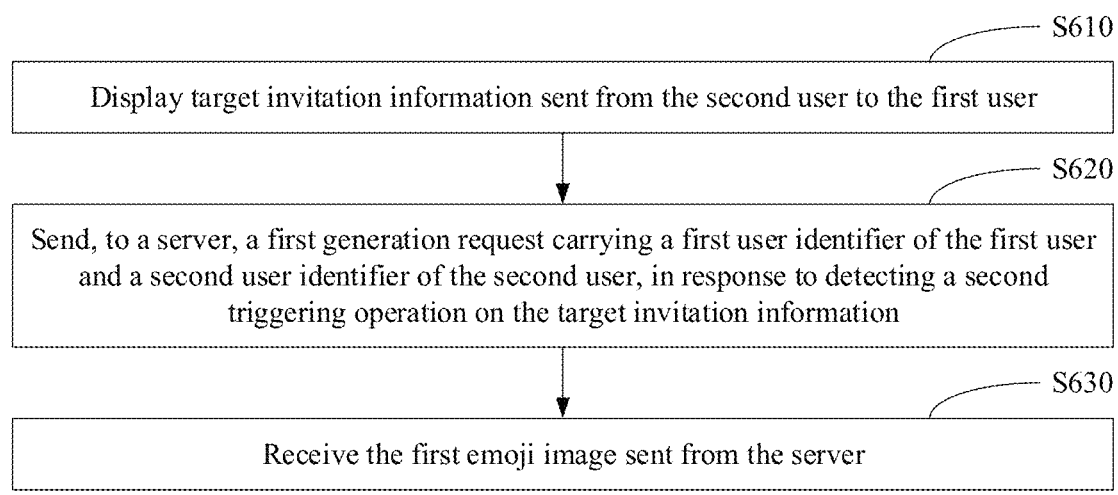
FIG. 6 is a schematic flowchart of a method for generating a first emoji image according to an embodiment of the present disclosure.

FIG. 6 illustrates a schematic flowchart of a method for generating a first emoji image according to an embodiment of the present disclosure.

As shown in FIG. 6, the method for generating a first emoji image may include the following steps S610 to S630.

In step S610, target invitation information sent from the second user to the first user is displayed.

In an embodiment of the present disclosure, the second user may send, via the electronic device used by the second user such as the second electronic device 120 as shown in FIG. 1 and FIG. 2, a target group photo request to the electronic device used by the first user, such that the electronic device may display target invitation information corresponding to the target group photo request sent from the second user to the first user. The target invitation information may be used to prompt the first user that the second user has sent the group photo invitation.

Optionally, the target invitation information may include any one of first invitation information and second invitation formation.

In some embodiments, the first invitation information may be invitation information sent to the first user from the second user by triggering first invitation prompt information displayed in the chat interface. The first invitation prompt information is used to promote to the second user that he may send group photo invitation to the first user.

In one example, the electronic device used by the second user may display the first invitation prompt information in the chat interface in the event that both the first user and the second user have generated a custom selfie emoji image. If the second user wants to take an emoji shot with the first user, the first invitation prompt information may be triggered, to cause the electronic device used by the second user to send a first group photo request to the first user, which in turn causes the electronic device used by the first user to display first invitation information corresponding to the first group photo request.

In another example, the electronic device used by the second user may display the first invitation prompt information in the chat interface regardless of whether the first user and the second user have generated a custom selfie emoji image. If the second user wants to take an emoji shot with the first user, the second user may trigger the first invitation prompt information, to cause the electronic device used by the second user to send a first group photo request to the first user, which in turn causes the electronic device used by the first user to display first invitation information corresponding to the first group photo request.

In other embodiments, the second invitation information may be invitation information sent to the first user from the second user by triggering second invitation prompt information displayed in the emoji presentation panel for presenting a second emoji image. The second emoji image is generated based on the second face image, i.e. the second emoji image is a custom selfie emoji image of the second user.

The second invitation prompt information is used to prompt the second user that he or she may send a group photo invitation to other users in the address book.

Further, the second invitation prompt information may further be used to prompt the second user that he or she may send a group photo invitation to other users in the address book who have generated the custom selfie emoji image.

In the above embodiment, the second user may access, via the used electronic device, the emoji presentation panel for presenting the second user's custom selfie emoji image, and the second invitation prompt information may be displayed in the emoji presentation panel. If the second user wants to take an emoji shot with other users who have generated custom selfie emoji images, the second user may trigger the second invitation prompt information to cause the electronic device used by the second user to display user information such as user avatars and/or user names of other users who have generated custom selfie emoji images. The second user may select the user information of at least one user from the displayed user information by performing an operation such as clicking on the user information of at least one user. In a case that the at least one user selected by the second user includes the first user, the electronic device used by the second user may send a second group photo request to the first user, which in turn causes the electronic device used by the first user to display second invitation information corresponding to the second group photo request.

In an embodiments of the present disclosure, optionally, step S610 may specifically include: displaying, in the chat interface, target invitation information sent from the second user to the first user.

Figure 7:
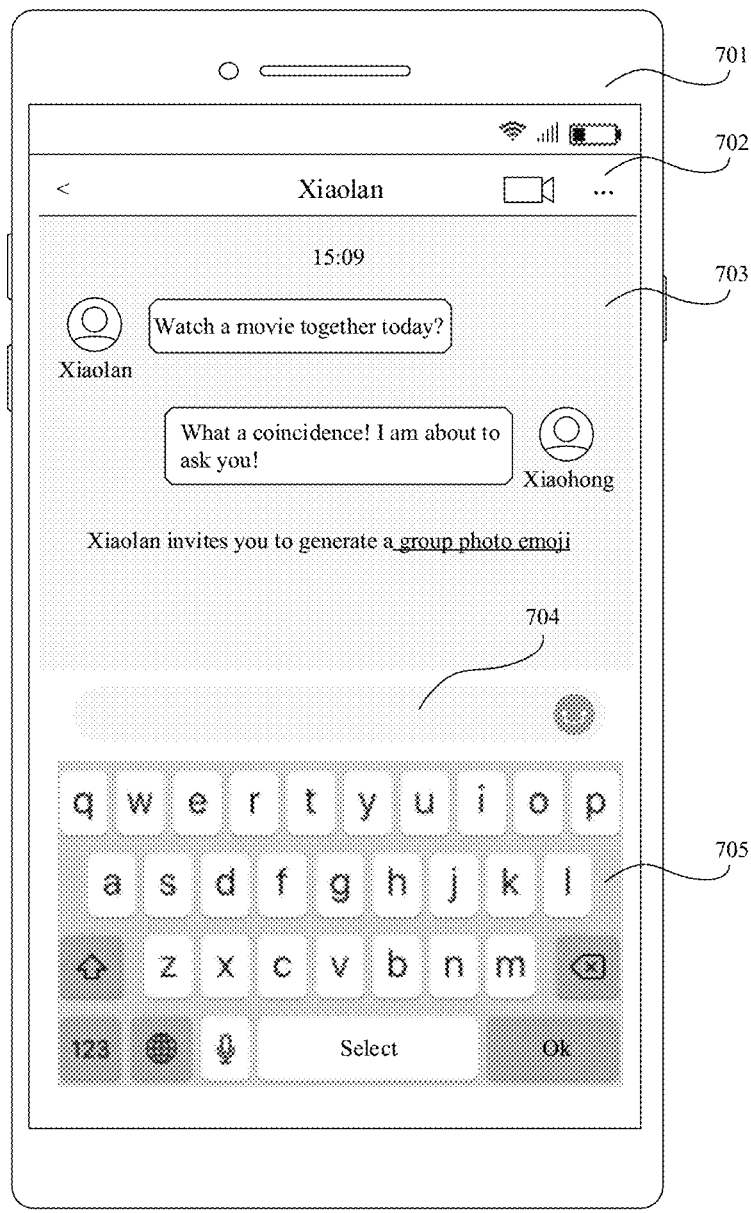
FIG. 7 is a schematic diagram of invitation information according to an embodiment of the present disclosure.

Optionally, the electronic device may display the target invitation information in an information display area of the chat interface. FIG. 7 illustrates a schematic diagram of invitation information according to an embodiment of the present disclosure.

As shown in FIG. 7, the electronic device 701 may display a chat interface 702 in which Xiaohong performs a chat with Xiaolan. An information display area 703, an input box 704, and a virtual keyboard control 705 are displayed in the chat interface 702. In a case that the electronic device 701 receives a group photo invitation from Xiaolan to Xiaohong, the information display area 703 may display invitation information "Xiaolan invites you to generate a group photo emoji."

In an embodiment of the present disclosure, optionally, after the second user triggers the invitation prompt information, the electronic device used by the second user may display multiple group photo emoji template images. The second user may select at least one from the multiple group photo emoji template images, and the electronic device used by the second user may obtain a target template identifier of the group photo emoji template image selected by the second user and send to the first user target invitation information corresponding to the target group photo request, where the target invitation information carries the target template identifier.

Step S620 is described continually with reference to FIG. 6.

In S620, a first generation request carrying a first user identifier of the first user and a second user identifier of the second user is sent to a server, in response to detecting a second triggering operation on the target invitation information.

In an embodiment of the present disclosure, if the user accepts the group photo invitation after the electronic device displays the target invitation information, the user may perform a second trigger operation on the target invitation information. The electronic device may detect the user's operation on the chat interface in real time. In response to detecting the second trigger operation of the user performed on the target invitation information, the server may send a first generation request carrying the first user identifier of the first user and the second user identifier of the second user.

Optionally, the second trigger operation may be an operation such as a click, long press, double click on the target invitation information, which is not limited herein.

Continuing to refer to FIG. 7, in view of the invitation information, Xiaohong may click on the words "group photo emoji" in the invitation information, to cause the electronic device to send to the server a group photo emoji generation request carrying a user identifier of Xiaohong and a user identifier of Xiaolan.

In some embodiments, in a case that the first user has generated a custom selfie emoji image, the electronic device may directly send to the server a first generation request carrying the first user identifier of the first user and the second user identifier of the second user.

In other embodiments, in a case that the first user has not generated a custom selfie emoji image, before sending the first generation request to the server, the image display method may further includes: displaying a face capture interface; and upon capturing the first face image on the face capture interface, sending the first face image to the server.

Specifically, in a case that the first user has not generated a custom selfie emoji image, upon detecting the second trigger operation on the target invitation information, the electronic device may firstly display the face capture interface. Upon capturing the first face image on the face capture interface, the electronic device may send the first face image to the server, and then send to the server the first generation request carrying the first user identifier of the first user and the second user identifier of the second user.

In some embodiments, in a case that the second user has not generated a custom selfie emoji image, the server, after receiving the first generation request, may send an image acquisition request to the electronic device used by the second user, causing the electronic device used by the second user to display image upload prompt information corresponding to the image acquisition request, so as to prompt the second user to send the second face image of the second user to the server via the image upload prompt information, thereby enabling the server to obtain the second face image of the second user.

In embodiments of the present disclosure, the first generation request may be used to instruct the server to generate the first emoji image based on the first face image stored in association with the first user identifier, the second face image stored in association with the second user identifier, and a first emoji template image, and send back the first emoji image.

Specifically, the server may firstly perform face segmentation processing on the first face image and the second face image separately to cut out a first user face in the first face image and a second user face in the second face image, then may separately perform edge optimization such as blurring and feathering on the cut out first user face and the second user face, and then may perform head following and emoji migration on the first face image and the second face image to obtain a dynamic face picture. One face image corresponds to one face region in the first emoji template image, and one face region corresponds to one head position and one emoji. Finally, each frame of each first emoji template image is composed with a corresponding frame of the dynamic face picture, to generate a first emoji image corresponding to each first emoji template image.

In some embodiments, in a case that the second user selects to generate a custom emoji image of group photo with multiple users, the target invitation information may carry user identifiers of all users. The first generation request may carry the user identifiers of all users, and the server may generate the first emoji image based on face images of all users after receiving generation requests sent by the users corresponding to all user identifiers.

In an embodiment of the present disclosure, optionally, the target invitation information may carry a target template identifier, and the target template identifier may be a template identifier of an emoji template, such as a group photo emoji template, selected by the second user.

Accordingly, the first generation request may further carry a target template identifier, and the first emoji template image may be an emoji template image corresponding to the target template identifier.

Specifically, the server may generate the first emoji image based on the first face image stored in association with the first user identifier, the second face image stored in association with the second user identifier, and the first emoji template image corresponding to the target template identifier, and send back the first emoji image, which is not repeated herein.

As a result, the server may generate a custom emoji image of group photo including the first user and the second user based on the emoji template selected by the second user, thereby increasing the flexibility of generating the custom emoji image of group photo.

In step S630, the first emoji image sent fed-back by the server is received.

Specifically, the electronic device may pull the first emoji image from the server to receive the first emoji image fed-back by the server.

In some embodiments, the electronic device may pull the first emoji image in real time after sending the first generation request.

In other embodiments, after sending the first generation request, the electronic device may wait for a predetermined waiting time before pull the first emoji image.

Thus, in embodiments of the present disclosure, the material for the first emoji image is collected in a simple manner and the user does not need to design the emoji image with text, stickers, or the like, which can reduce the time for creating the emoji image and enhance the user experience.

In other embodiments of the present disclosure, the chat interface may be an interface in which the first user performs a chat with the second user.

Accordingly, in a case that no first emoji image is detected and a third emoji image is detected, the target emoji image may include the third emoji image. The third emoji image is generated based on the first face image, that is, the third emoji image may be a custom selfie emoji image of the first user, and the emoji type of the third emoji image is a selfie type.

Further, the target entry icon may be a third emoji entry icon, i.e. an entry icon to the custom selfie emoji of the first user.

Further, the target emoji presentation panel may be a third emoji presentation panel, i.e. an emoji presentation panel for presenting the custom selfie emoji image of the first user.

Figure 8:
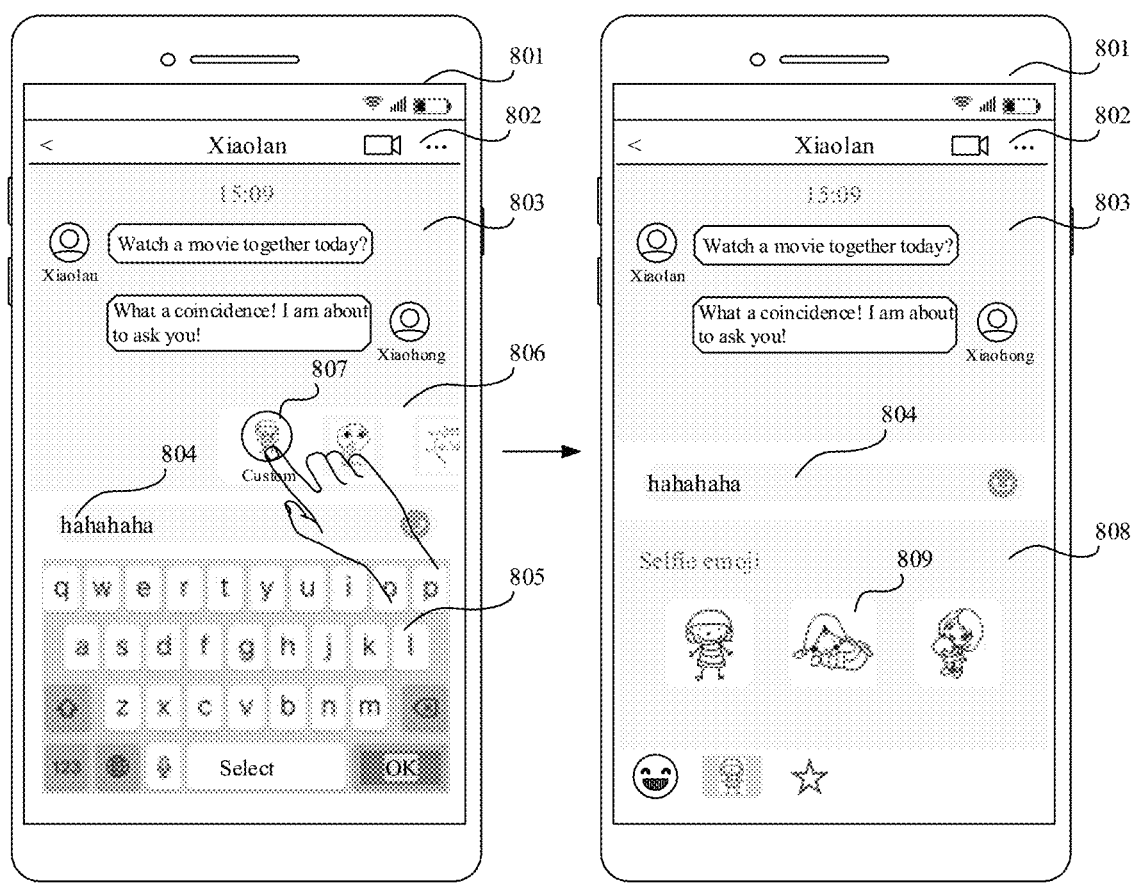
FIG. 8 is a schematic diagram of an entry triggering process according to another embodiment of the present disclosure.

FIG. 8 illustrates a schematic diagram of an entry triggering process according to another embodiment of the present disclosure.

As shown in FIG. 8, the electronic device 801 may display a chat interface 802 in which Xiaohong performs a chat with Xiaolan. An information display area 803, an input box 804, and a virtual keyboard control 805 are displayed in the chat interface 802. When Xiaohong enters the input text "hahahaha" in the input box 804, the electronic device determines that the input text "hahahaha" triggers an emoji recommendation event and displays an emoji recommendation panel 806 in the information display area 803 above the input box 804 in right-aligned form. If the electronic device 801 detects that there is no local custom emoji image of group photo of Xiaohong and Xiaolan but there is a local custom selfie emoji image of Xiaohong, an entry icon 807 corresponding to the custom selfie emoji image may be displayed in the emoji recommendation panel 806. Xiaohong may click on the entry icon 807 to the custom selfie emoji image. The electronic device, upon detecting the click operation on the entry icon 807, may replace the virtual keyboard control 805 with an emoji presentation panel 808 of the custom selfie emoji image. A preview image 809 of the custom selfie emoji image may be displayed in the emoji presentation panel 808.

Thus, in the embodiments of the present disclosure, in a case that the electronic device does not have a custom emoji image of group photo including the chatting users in the current chat interface but has the custom selfie emoji image of the first user, the entry icon corresponding to the custom selfie emoji image may be displayed directly to help the user quickly access the emoji presentation panel of the custom selfie emoji image. In a case that in the user's electronic device there is a custom emoji image of group photo with other users, the usable custom emoji images can be intelligently recommended to the user, to avoid infringing on others' portrait rights and further enhance the user experience.

In some further embodiments of the present disclosure, the chat interface may be an interface in which the first user performs a chat with the second user.

Accordingly, the target emoji image may include a second emoji template image in a case that no third emoji image is detected. The third emoji image is generated based on the first face image of the first user and the second emoji template image. That is, the third emoji image may be a custom selfie emoji image of the first user generated by using the second emoji template image.

In some embodiments, the second user, after generating a custom selfie emoji image, may send a group photo invitation to the first user who has generated his custom selfie emoji image. In this case, it can be determined that the first user has not generated any custom emoji image as long as the electronic device detects no local third emoji image, i.e. no local custom selfie emoji image of the first user. Therefore, the second emoji template image may be used as the target emoji image such that the target emoji image may include the second emoji template image.

In other embodiments, the second user may send a group photo invitation to the first user regardless of whether the first user and the second user have generated a custom selfie emoji image. In this case, if the electronic device detects neither local third emoji image nor local first emoji image, i.e., neither local custom selfie emoji image of the first user nor local custom emoji image of group photo of the first user and the second usery, the electronic device may determine that the first user does not have a custom emoji image. Therefore the second emoji template image may be used as the target emoji image, such that the target emoji image may include the second emoji template image.

Further, the target entry icon may be a second emoji template entry icon, i.e. an entry icon of an emoji template used to generate the custom selfie emoji of the first user.

Further, the target emoji presentation panel may be a second emoji template display panel, i.e. an emoji presentation panel for presenting the second emoji template image.

Figure 9:
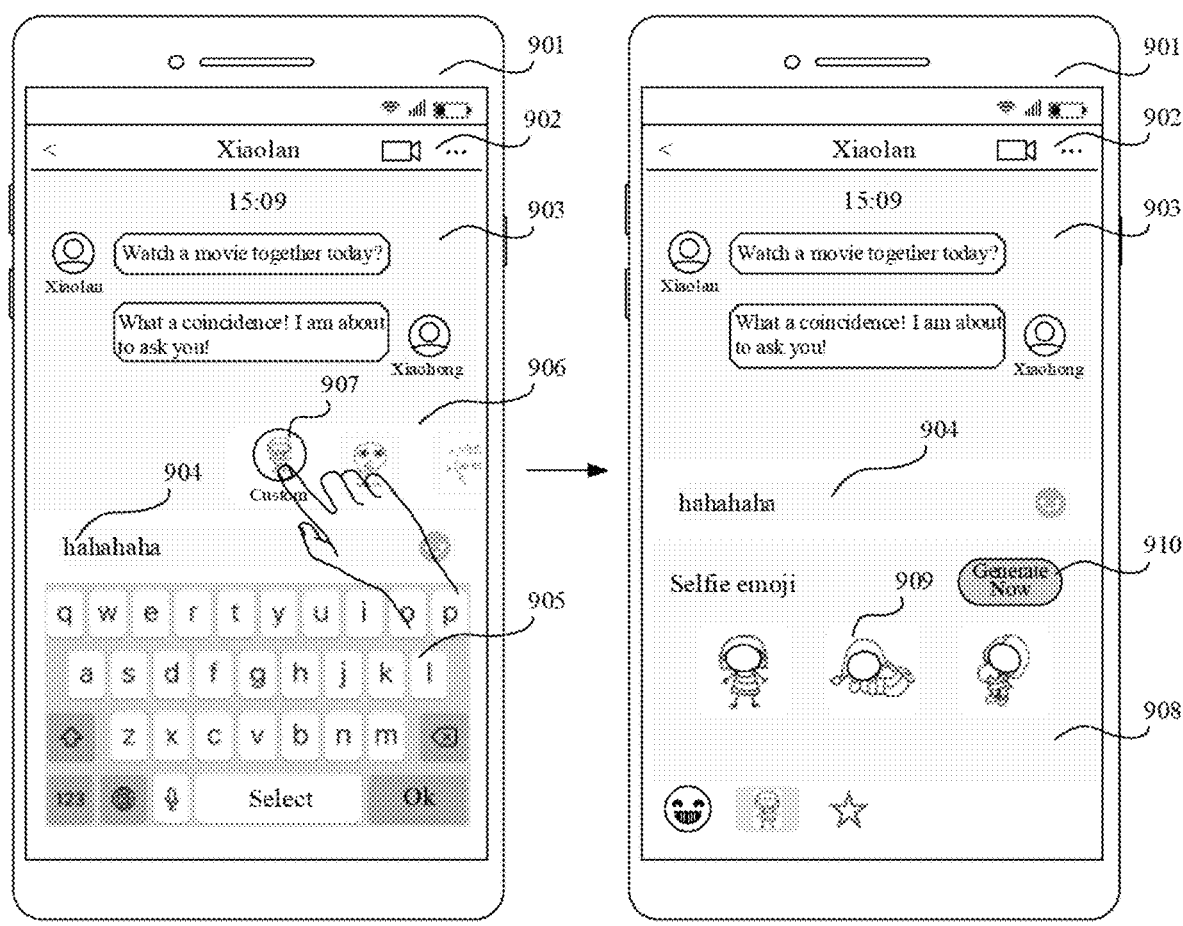
FIG. 9 is a schematic diagram of an entry triggering process according to yet another embodiment of the present disclosure.

FIG. 9 illustrates a schematic diagram of an entry triggering process according to yet another embodiment of the present disclosure.

As shown in FIG. 9, the electronic device 901 may display a chat interface 902 in which Xiaohong performs a chat with Xiaolan. An information display area 903, an input box 904, and a virtual keyboard control 905 are displayed in the chat interface 902. When Xiaohong enters the input text "hahahaha" in the input box 904, the electronic device determines that the input text "hahahaha" triggers an emoji recommendation event and displays the emoji recommendation panel 906 in the information display area 903 above the input box 904 in right-aligned form. In a case that the electronic device 901 detects that there is no local custom emoji image of group photo of Xiaohong and Xiaolan and there is no custom selfie emoji image of Xiaohong, an entry icon 907 to an emoji template for generating the custom selfie emoji of Xiaohong may be displayed in the emoji recommendation panel 906. Xiaohong may click on the emoji template entry icon 907. The electronic device, upon detecting the click operation on the emoji template entry icon 907, may replace the virtual keyboard control 905 with an emoji presentation panel 908 of emoji template image for generating the custom selfie emoji of Xiaohong. A preview image 909 of the emoji template image for generating the custom selfie emoji of Xiaohong may be displayed in the emoji presentation panel 908.

In an embodiment of the present disclosure, optionally, both the second emoji template image and the face region in the preview image of the second emoji template image may be displayed as blank, as shown in the preview image 909 in FIG. 9.

In an embodiment of the present disclosure, optionally, the target emoji presentation panel may further display an emoji generation trigger control, such as the "Generate Now" button 910 in FIG. 9. The emoji generation trigger control may be used to trigger the generation of the custom selfie emoji image of the first user. Thus, the user may cause the electronic device to generate the custom selfie emoji image of the first user by triggering the emoji generation trigger control.

Further, the electronic device may further generate a third emoji image after displaying the target emoji presentation panel corresponding to the target entry icon.

Figure 10:
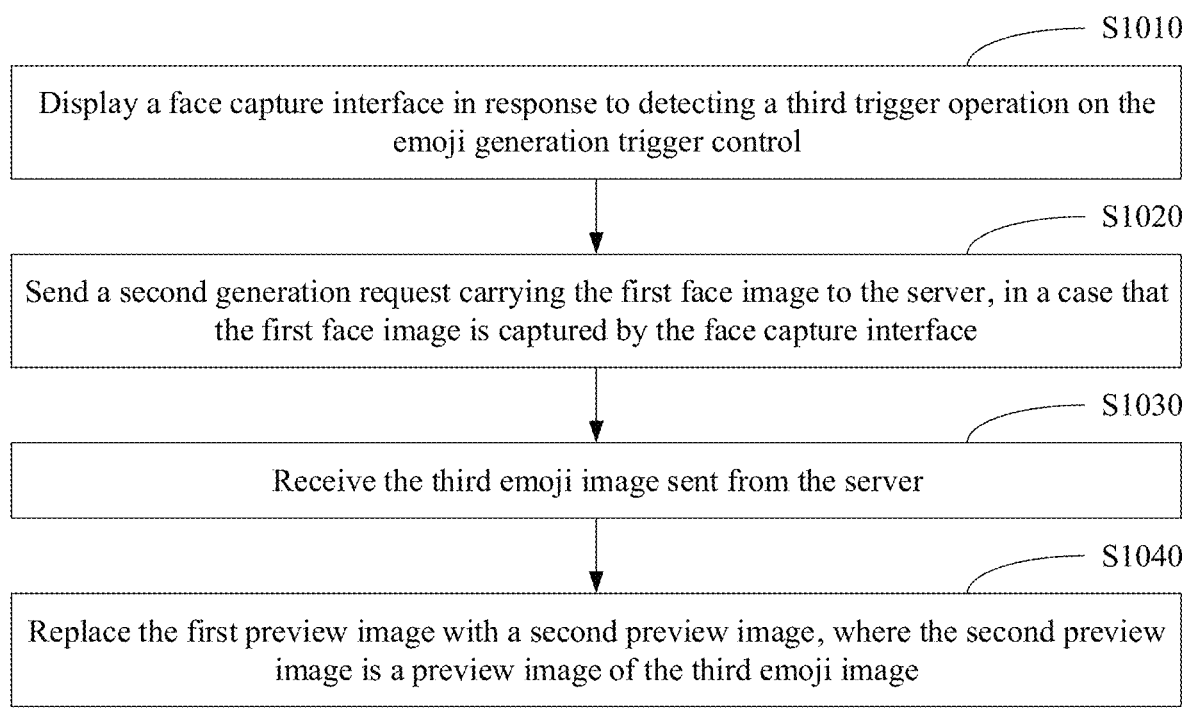
FIG. 10 is a schematic flowchart of a method for generating a third emoji image according to an embodiment of the present disclosure.

FIG. 10 illustrates a schematic flowchart of a method for generating a third image according to an embodiment of the present disclosure.

As shown in FIG. 10, the method for generating a third emoji image may include the following steps S1010 to S1040.

In step S1010, a face capture interface is displayed in response to detecting a third trigger operation on the emoji generation trigger control.

Specifically, once the emoji generation trigger control is displayed in the target emoji presentation panel, the user may perform the third trigger operation on the emoji generation trigger control. The electronic device may detect the user's operation performed on the target emoji presentation panel in real time, and display the face capture interface in response to detecting the third trigger operation on the emoji generation trigger control.

Optionally, the third trigger operation may be an operation such as a click, long press, double click on the emoji generation trigger control, which is not limited herein.

Optionally, the electronic device may jump from the chat interface to the face capture interface, in response to detecting the third trigger operation on the emoji generation trigger control.

Further, the face capture interface may include a face capture box. Optionally, the face capture box may have a predetermined face capture angle.

In step S1020, once the first face image is captured by the face capture interface, a second generation request carrying the first face image is sent to a server.

Specifically, the user may capture the first face image through the face capture interface, and the electronic device may send the second generation request carrying the captured first face image to the server once the first face image is captured by the face capture interface.

In some embodiments, the electronic device may capture the first face image displayed in the face capture box once a full face is displayed in the face capture box of the face capture interface, and may send the second generation request carrying the first face image to the server once the first face image is captured by the face capture interface.

In other embodiments, the electronic device may, once a full face is displayed in the face capture box of the face capture interface, illuminate a photo control in the face capture interface. The user may click on the photo control, to cause the electronic device to capture the first face image displayed in the face capture box in response to the user clicking on the photo control. Once the first face image is captured by the face capture interface, the electronic device sends, to the server, the second generation request carrying the first face image.

A full face being displayed in the face capture box means that the whole of the face is in the face capture box and the height of the face is not less than half the height of the face capture box.

In an embodiment of the present disclosure, the second generation request may be used to instruct the server to generate a third emoji image based on the first face image and the second emoji template image and feed-back the third emoji image.

The specific process of generating the third emoji image by the server is similar to the specific process of generating the first emoji image and is not repeated herein.

In step S1030, the third emoji image fed-back by the server is received.

Specifically, the electronic device may pull the third emoji image from the server to receive the third emoji image fed-back by the server.

In some embodiments, the electronic device may pull the third emoji image in real time after sending the second generation request.

In other embodiments, the electronic device may further pull the third emoji image after sending the second generation request and after waiting a predetermined waiting time.

In step S1040, the first preview image is replaced with a second preview image, where the second preview image is a preview image of the third emoji image.

Specifically, the electronic device may replace the first preview image with the second preview image corresponding to the third emoji image in the target emoji presentation panel after the third emoji image is pulled, allowing the electronic device to display the third emoji image to the user after the third emoji image is created.

Optionally, in a case that the electronic device jumps from the chat interface to the face capture interface, the electronic device may jump back from the face capture interface to the chat interface after receiving the third emoji image fed-back by the server.

Thus, in the embodiments of the present disclosure, the material of the third emoji image is captured in a simple manner, and there is no need for the user to design the emoji image with text, stickers, or the like, which can reduce the production time of the emoji image and enhance the user experience.

In another embodiment of the present disclosure, the target emoji image may include a first target text displayed in a predetermined text style, and the first preview image may include a first target text displayed in a predetermined text style.

In an embodiment of the present disclosure, each target emoji image may correspond to a predetermined text style.

In some embodiments, the predetermined text style may include at least one of a font style, a color style, a stroke style, a position style, and an angle style, which is not limited herein.

Optionally, the first target text may include the input text in a case that the quantity of words in the input text is less than or equal to a predetermined quantity threshold; the first target text may include a predetermined text in a case that the quantity of words in the input text is greater than the predetermined quantity threshold.

The predetermined quantity threshold may be any value set as desired, which is not limited herein. For example, the predetermined quantity threshold may be 3, 5, 10, 20, or the like.

Specifically, after determining the target emoji image, the electronic device may first determine whether the quantity of words of the input text is less than or equal to the predetermined quantity threshold. In a case that the quantity is less than or equal to the predetermined quantity threshold, the electronic device adds the input text to the target emoji image in the predetermined text style, such that the target emoji image includes the input text in the predetermined text style. Otherwise, the electronic device adds the predetermined text to the target emoji image in the predetermined text style such that the target emoji image includes the predetermined text in the predetermined text style.

Optionally, each target emoji image may correspond to a predetermined text.

Figure 11:
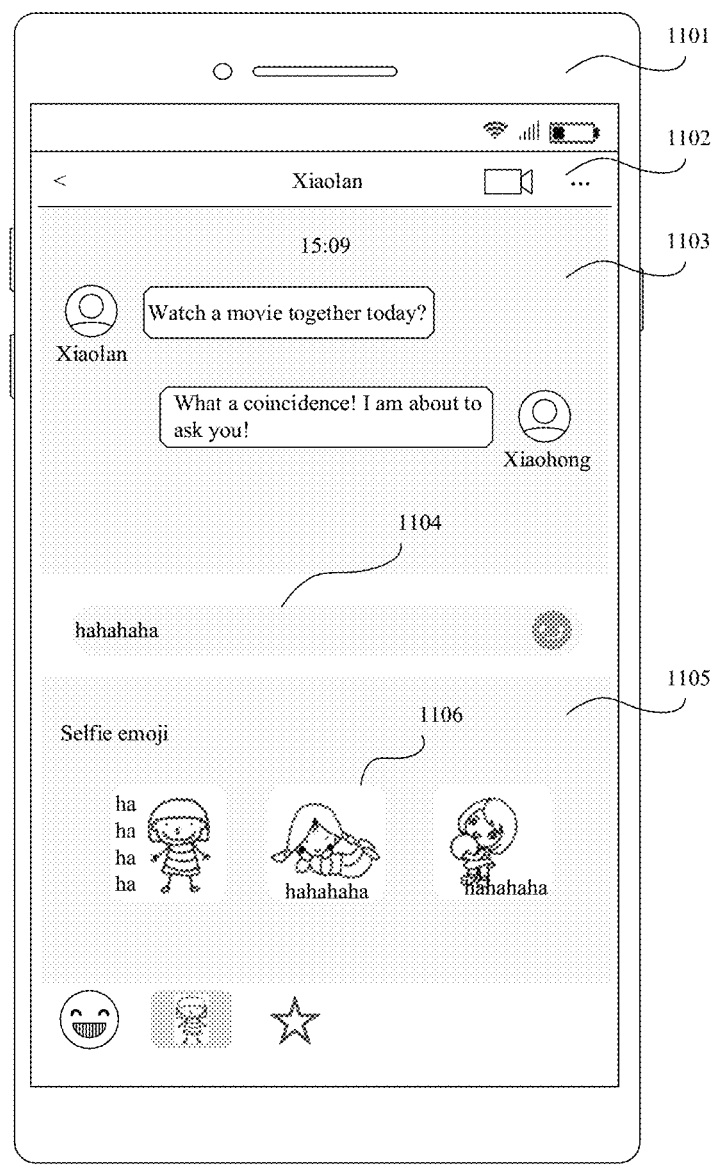
FIG. 11 is a schematic diagram of an emoji presentation panel according to an embodiment of the present disclosure.

FIG. 11 illustrates a schematic diagram of an emoji presentation panel according to an embodiment of the present disclosure.

As shown in FIG. 11, the electronic device 1101 may display a chat interface 1102 in which Xiaohong performs a chat with Xiaolan. An information display area 1103, an input box 1104, and an emoji presentation panel 1105 of a custom selfie emoji image are displayed in the chat interface 1102. When the input box 1104 is displayed with the input text "hahahaha", since the quantity of words of the input text is 4, in a case that the predetermined quantity threshold is 5, the quantity of words is less than the predetermined quantity threshold, a preview image 1106 of the custom selfie emoji image displayed in the emoji presentation panel 1105 may include the input text "hahahaha" displayed in the predetermined text style.

Optionally, the custom selfie emoji image corresponding to the preview image 1106 may also include the input text "hahahaha" displayed in the predetermined text style.

Figure 12:
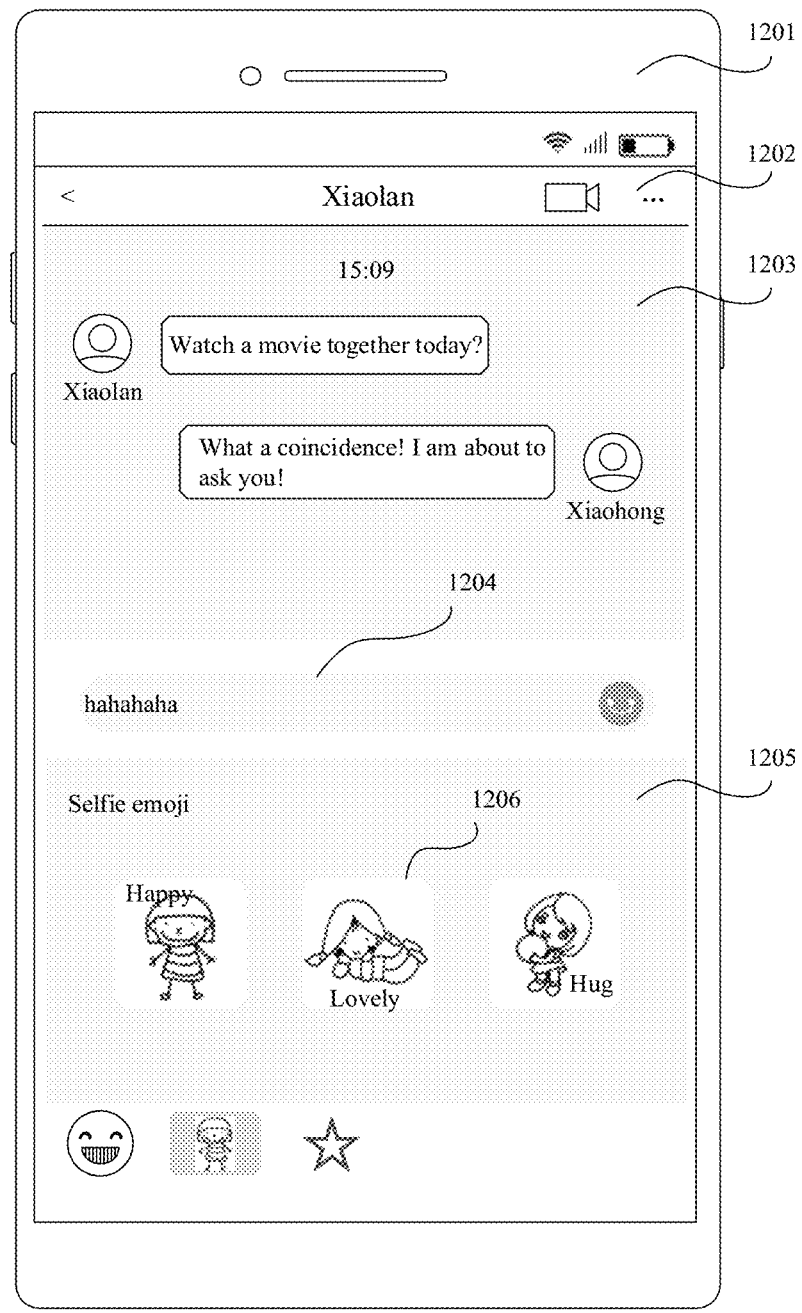
FIG. 12 is a schematic diagram of an emoji presentation panel according to another embodiment of the present disclosure.

FIG. 12 illustrates a schematic diagram of an emoji presentation panel according to another embodiment of the present disclosure.

As shown in FIG. 12, the electronic device 1201 may display a chat interface 1202 in which XiaoHong performs a chat with XiaoLan. An information display area 1203, an input box 1204, and an emoji presentation panel 1205 of a custom selfie emoji image are displayed in the chat interface 1202. When the input box 1204 is displayed with the input text "hahahaha", since the quantity of words of the input text is 4, in a case that the predetermined quantity threshold is 3, the quantity of words is greater than the predetermined quantity threshold, an preview image 1206 of the custom selfie emoji image displayed in the emoji presentation panel 1205 may include a predetermined text displayed in a predetermined text style. One preview image 1206 corresponds to one predetermined text.

Optionally, the custom selfie emoji image corresponding to the preview image 1206 may also include the predetermined text displayed in a predetermined text style.

Thus, in the embodiments of the present disclosure, the text displayed in the first preview image can be flexibly adjusted based on the input text, further enhancing the user experience.

In an embodiment of the present disclosure, optionally, after displaying the target emoji presentation panel corresponding to the target entry icon, the image display method may further include:

in response to detecting a fourth trigger operation on a target preview image in the first preview image, displaying a target emoji image corresponding to the target preview image in an information display area of the chat interface, where the target emoji image corresponding to the target preview image includes the first target text.

Specifically, once an emoji recommendation panel in which a target entry icon is presented is displayed in the chat interface, the user may perform the first trigger operation on the target entry icon. The electronic device may detect the user's operation on the chat interface in real time. Upon detecting the first trigger operation on the target entry icon, the electronic device may stop displaying the emoji recommendation panel, and display, in the chat interface, the target emoji presentation panel corresponding to the target entry icon. After displaying the target emoji presentation panel, the user may perform the fourth trigger operation on the target preview image in the first preview image. The electronic device may detect the user's fourth trigger operation on the target preview image in real time. Upon detecting the fourth trigger operation on the target preview image, the electronic device may send the target emoji image corresponding to the target preview image to the electronic device used by the second user via the server, and display, in the information display area of the chat interface, the target emoji image corresponding to the target preview image. The first target text may be displayed in the target emoji image corresponding to the target preview image.

Optionally, the fourth trigger operation may be an operation such as a click, a long press, a double click on the target preview image, which is not limited herein.

As a result, in the chat of users, the electronic device is enabled to automatically adjust the text displayed in the custom emoji image based on the input text entered by the user, increasing the flexibility for the user to use the custom target emoji image.

In a further embodiment of the present disclosure, to further enhance the user experience, the target entry icon may include a target entry image.

Optionally, the target entry image may include any one of a first entry image and a second entry image.

In some embodiments, the first entry image is an image randomly selected from the first preview images.

Specifically, after determining the target emoji images, the electronic device may randomly select an image from the first preview images corresponding to the target emoji images and use the selected image as the first entry image.

In other embodiments, the second entry image is a preview image of a target emoji image which is of the same sentiment type as the input text.

In one example, after determining the target emoji images, the electronic device may detect the target emoji images, and use the preview image of the target emoji image having sentiment type corresponding to the input text as the second entry image.

In another example, after determining the target emoji images, the electronic device may detect image tags of the target emoji images, and use the preview image of a target emoji image with the image tag being a sentiment keyword in the input text as the second entry image.

Thus, in the embodiments of the present disclosure, the target entry image can be flexibly adjusted based on the input text, further enhancing the user experience.

In some embodiments of the present disclosure, no text is displayed in the target entry icon.

In other embodiments of the present disclosure, the target entry icon may further include a second target text displayed in a predetermined text style.

Optionally, the second target text may include first predetermined quantity of words of the input text.

The predetermined quantity may be any value set as desired, which is not limited herein. For example, the predetermined quantity may be 1, 2, 3, or the like.

Figure 13:
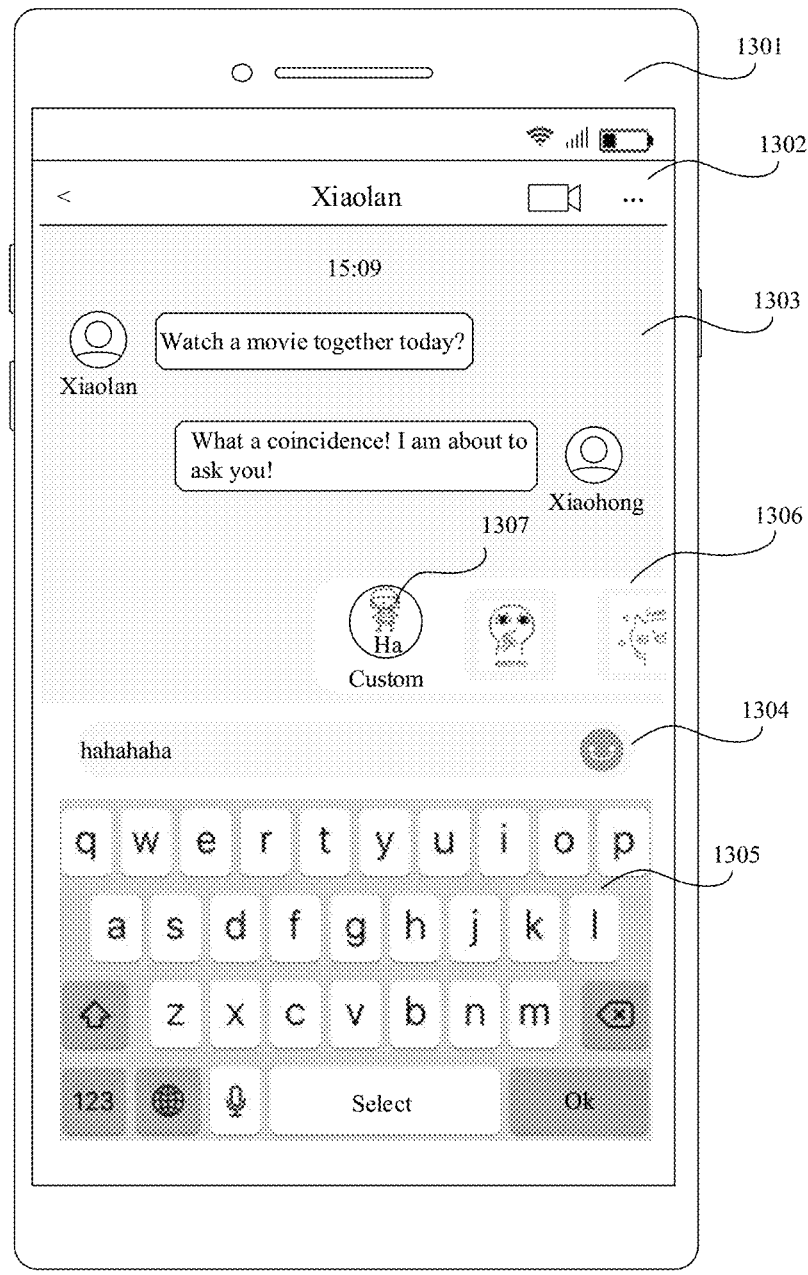
FIG. 13 is a schematic diagram of an emoji recommendation panel according to another embodiment of the present disclosure.

FIG. 13 illustrates a schematic diagram of an emoji recommendation panel according to another embodiment of the present disclosure.

As shown in FIG. 13, the electronic device 1301 may display a chat interface 1302 in which Xiaohong performs a chat with Xiaolan. An information display area 1303, an input box 1304, and a virtual keyboard control 1305 are displayed in the chat interface 1302. When Xiaohong enters the input text "hahahaha" in the input box 1304, the electronic device determines that the input text "hahahaha" triggers an emoji recommendation event, and displays an emoji recommendation panel 1306 in the information display area 1303 above the input box 1304 in right-aligned form. Once the electronic device 1301 detects that there is no local custom emoji image of group photo of Xiaohong and Xiaolan but there is a local custom selfie emoji image of Xiaohong, an entry icon 1307 corresponding to the custom selfie emoji image may be displayed in the emoji recommendation panel 1306. The entry icon 1307 to the custom selfie emoji may include a preview image of an emoji image randomly selected from custom selfie emoji images and the first word "ha" in the input text "hahahaha".

In some embodiments, no text is displayed in the target entry icon in a case that the quantity of words of the input text is greater than a predetermined quantity threshold; and the target entry icon may include the first predetermined quantity of words of the input text in a case that the quantity of words of the input text is less than or equal to the predetermined quantity threshold.

In other embodiments, the second target text may include an ellipsis, for example " . . . ", in a case that the quantity of words in the input text is greater than the predetermined quantity.

Thus, the second target text may be a text including the first predetermined quantity of words in the input text and the ellipsis.

Thus, in the embodiments of the present disclosure, the text displayed in the target entry icon can be flexibly adjusted based on the input text, further enhancing the user experience.

In a further embodiment of the present disclosure, the emoji recommendation panel may display a third preview image, and the third preview image may include the target entry icon and a preview image of a fourth emoji image. That is, the emoji recommendation panel may display the preview image of the fourth emoji image in addition to the target entry icon.

The fourth emoji image may be a non-custom emoji image of a sentiment type same as that of the input text.

In one example, the fourth emoji image may be a non-custom emoji image of a sentiment type corresponding to the input text.

In another example, alternatively, the fourth emoji image may be a non-custom emoji image with the image tag being a sentiment keyword in the input text.

Optionally, the target entry icon may be displayed preceding the preview image of the fourth emoji image. As shown in FIG. 4, the target entry icon 407 may be located at left side of the preview images 408 of all the fourth emoji images.

In some embodiments, the target entry icon may be displayed fixedly in the emoji recommendation panel, and the display position of the target entry icon remains unchanged even if the user performs a swipe operation in the emoji recommendation panel.

In other embodiments, the target entry icon may be displayed non-fixedly in the emoji recommendation panel, and the display position of the target entry icon may change with a swipe direction of a swipe operation when the user performs the swipe operation in the emoji recommendation panel.

In an embodiment of the present disclosure, optionally, after displaying the emoji recommendation panel, the image display method may further include:
  obtaining a display duration of the emoji recommendation panel;
  stopping displaying the emoji recommendation panel, in a case that the display duration reaches a predetermined duration and the third preview image is not triggered; and
  displaying the target entry icon in the chat interface.

Specifically, in a case that the electronic device is displaying the chat interface, the user may enter input text in an input box of the chat interface, and while the user is entering the input text, the electronic device may detect the input text in real time. Once it is detected that the input text triggers an emoji recommendation event, the electric device may display, in the chat interface, an emoji recommendation panel in which a target entry icon is presented. After displaying the emoji recommendation panel, the electronic device may obtain the display duration of the emoji recommendation panel, and in a case that the display duration reaches the predetermined duration and the third preview image is not triggered, the electric device stops displaying the emoji recommendation panel and display the target entry icon in the chat interface.

In some embodiments, after stopping displaying the emoji recommendation panel, the target entry icon may be displayed in the information display area of the chat interface.

Optionally, the target entry icon may be displayed in the information display area with being right-aligned and located above the input box.

In one example, the size of the target entry icon may remain unchanged after the display of the emoji recommendation panel is stopped. In another example, the size of the target entry icon may be reduced by a predetermined proportion after the display of the emoji recommendation panel is stopped, which is not limited herein.

The predetermined proportion may be set as desired, which is not limited herein.

Continuing referring to FIG. 4, the emoji recommendation panel 406 may display a target entry icon 407 corresponding to the custom emoji image and may display preview images 408 of non-custom emoji images recommended based on the input text "hahahaha". The electronic device may, after displaying the emoji recommendation panel 406, obtain the display duration of the emoji recommendation panel 406. In a case that the display duration reaches a predetermined duration and it is not detected that the user triggers the target entry icon 407 or any of the preview images 408, the display of the emoji recommendation panel 406 is stopped and the display proceeds as shown in FIG. 14.

Figure 14:
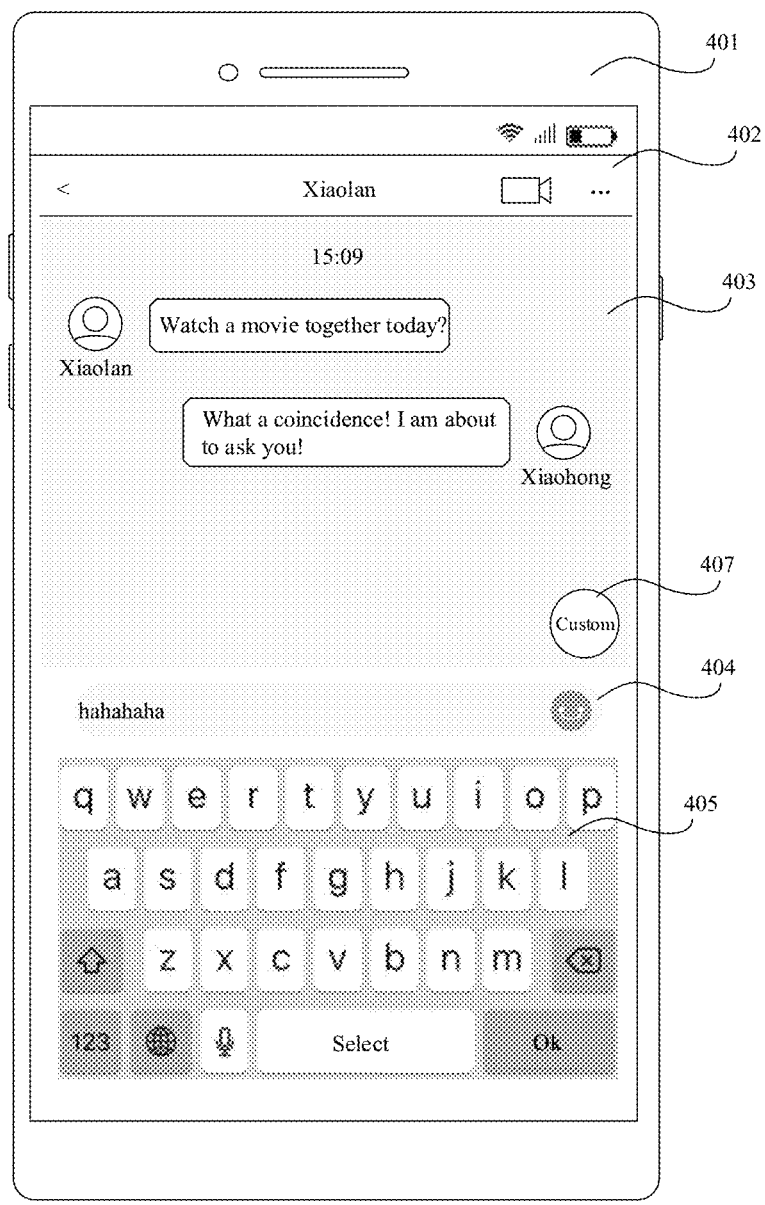
FIG. 14 is a schematic diagram of the manner for displaying an entry icon according to an embodiment of the present disclosure.

FIG. 14 illustrates a schematic diagram of the manner for displaying an entry icon according to an embodiment of the present disclosure.

As shown in FIG. 14, the electronic device 401 may display a chat interface 402 in which XiaoHong performs a chat with XiaoLan. An information display area 403, an input box 404, and a virtual keyboard control 405 are displayed in the chat interface 402. The input text "hahahaha" is displayed in the input box 404, and a target entry icon 407 is displayed in the information display area 403 above the input box 404 with being right-aligned.

In alternative embodiments, the target entry icon may be displayed between the input box and the virtual keyboard control of the chat interface, after the display of the emoji recommendation panel is stopped.

Specifically, the electronic device may continue to display the target entry icon in an emoji recommendation panel display area additionally displayed between the input box and the virtual keyboard control.

Optionally, the target entry icon may be displayed between the input box and the virtual keyboard control with being right-aligned.

In one example, the size of the target entry icon may remain unchanged after the display of the emoji recommendation panel is stopped. In another example, the size of the target entry icon may be reduced by a predetermined proportion after the display of the emoji recommendation panel is stopped, and in this case, the size of the emoji recommendation panel display area may also be reduced by a predetermined proportion, which is not limited herein.

The predetermined proportion may be set as desired, which is not limited herein.

Therefore, in the embodiments of the present disclosure, the display of the target entry icon can still be maintained even if the display of the emoji recommendation panel is stopped, further enhancing the convenience of the user in finding a custom target emoji image and improving the user experience.

In an embodiment of the present disclosure, optionally, after displaying the target entry icon, the image display method may further include:
stopping displaying the target entry icon in a case that no input text is displayed in the chat interface.

Specifically, after displaying the emoji recommendation panel, the electronic device may obtain the display duration of the emoji recommendation panel. If the display duration reaches the predetermined duration and the third preview image is not triggered, the electric device stops displaying the emoji recommendation panel and display the target entry icon in the chat interface. After the target entry icon is displayed, the electronic device may detect the input text displayed in the input box in real time, and stop displaying the target entry icon in response to detecting no input text being displayed in the input box, which means that the user has deleted all the input text in the input box.

Thus, in the embodiments of the present disclosure, the display of the target entry icon can be stopped in a case that no input text is displayed in the chat interface, avoiding the problem of continuingly displaying the target entry icon even when the user stops editing the chat content, and further enhancing the user experience.

Further, after obtaining the display duration of the emoji recommendation panel, in a case that the display duration does not reach a predetermined duration and a first trigger operation on the target entry icon is detected, the display of the emoji recommendation panel is stopped and the target emoji presentation panel corresponding to the target entry icon is displayed in the chat interface.

An image display apparatus for implementing the above image display method is further provided according to an embodiment of the present disclosure.

In an embodiment of the present disclosure, the image display apparatus may be an electronic device. In some embodiments, the electronic device may be the first electronic device 110 at client end as shown in FIG. 1 and FIG. 2. The electronic device may be a mobile phone, a tablet computer, a desktop computer, a laptop computer, a vehicle-mounted terminal, a wearable device, an all-in-one computer, a smart home device, and other devices having communication functions, or a device simulated by a virtual machine or an emulator.

The image display apparatus according to embodiments of the present disclosure will be described below with reference to FIG. 15.

Figure 15:
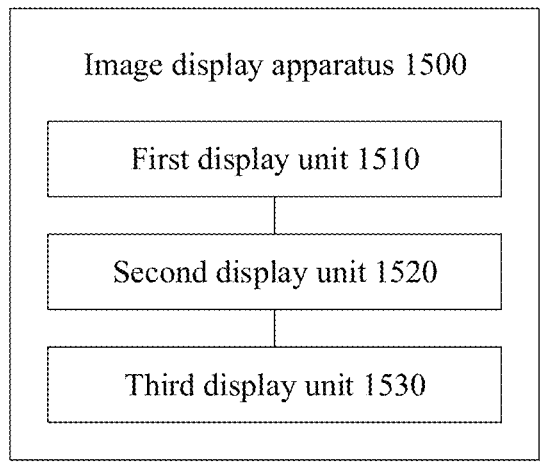
FIG. 15 is a schematic structural diagram of an image display apparatus according to an embodiment of the present disclosure.

FIG. 15 illustrates a schematic structural diagram of an image display apparatus according to an embodiment of the present disclosure.

As shown in FIG. 15, the image display apparatus 1500 may include a first display unit 1510, a second display unit 1520, and a third display unit 1530.

The first display unit 1510 may be configured to display an emoji recommendation panel in a chat interface once an input text displayed in the chat interface triggers an emoji recommendation event, where a target entry icon is displayed in the emoji recommendation panel, and the target entry icon is used to trigger the display of a custom target emoji image.

The second display unit 1520 may be configured to stop displaying the emoji recommendation panel in response to detecting a first trigger operation on the target entry icon.

The third display unit 1530 may be configured to display, in the chat interface, a target emoji presentation panel corresponding to the target entry icon, where a first preview image is displayed in the target emoji presentation panel, and the first preview image is a preview image of the target emoji image.

In an embodiment of the present disclosure, once the input text displayed in the chat interface triggers the emoji recommendation event, the emoji recommendation panel may be displayed in the chat interface. The emoji recommendation panel may include the target entry icon for triggering the display of the custom target emoji image. The display of the emoji recommendation panel may be stopped in response to detecting the first trigger operation on the target entry icon. In addition, the target emoji presentation panel corresponding to the target entry icon may be displayed in the chat interface, where a preview image of the target emoji image may be displayed in the target emoji presentation panel. Therefore, once the input text triggers the emoji recommendation event, the user can quickly access, directly through the target entry icon displayed in the emoji recommendation panel, the target emoji presentation panel in which the preview image of the target emoji image is displayed, thereby improving the convenience of finding the custom target emoji image by the user, simplifying the operation for the user to find the custom target emoji image, and thus enhancing the user experience.

In some embodiments of the present disclosure, the chat interface may be an interface in which a first user performs a chat with a second user.

Accordingly, once a first emoji image is detected, the target emoji image may include the first emoji image, and the first emoji image may be generated based on a first face image of the first user and a second face image of the second user.

In some embodiments of the present disclosure, the image display apparatus 1500 may further include a fourth display unit, a first sending unit and a first receiving unit.

The fourth display unit may be configured to display target invitation information sent from the second user to the first user.

The first sending unit may be configured to send, to a server, a first generation request carrying a first user identifier of the first user and a second user identifier of the second user, in response to detecting a second triggering operation on the target invitation information, where the first generation request may be used to instruct the server to generate the first emoji image based on the first face image stored in association with the first user identifier, the second face image stored in association with the second user identifier, and a first emoji template image, and send back the first emoji image.

The first receiving unit may be configured to receive the first emoji image fed-back by the server.

In some embodiments of the present disclosure, the target invitation information may include any one of:
  first invitation information, where the first invitation information may be invitation information sent to the first user from the second user by triggering first invitation prompt information displayed in the chat interface; and
  second invitation information, where the second invitation information may be invitation information sent to the first user from the second user by triggering second invitation prompt information displayed in an emoji presentation panel for presenting a second emoji image, and the second emoji image may be generated based on the second face image.

In some embodiments of the present disclosure, the target invitation information may carry a target template identifier, and the target template identifier may be a template identifier of an emoji template selected by the second user.

Accordingly, the first generation request may further carry the target template identifier, and the first emoji template image may be an emoji template image corresponding to the target template identifier.

In some embodiments of the present disclosure, the chat interface may be an interface in which a first user performs a chat with a second user.

Accordingly, in a case that no first emoji image is detected and a third emoji image is detected, the target emoji image may include the third emoji image, where the first emoji image may be generated based on a first face image of the first user and a second face image of the second user, and the third emoji image may be generated based on the first face image.

In some embodiments of the present disclosure, the chat interface may be an interface in which a first user performs a chat with a second user.

Accordingly, in a case that no third emoji image is detected, the target emoji image may include a second emoji template image, where the third emoji image may be generated based on a first face image of the first user and the second emoji template image.

In some embodiments of the present disclosure, an emoji generation trigger control may be displayed in the target emoji presentation panel.

Accordingly, the image display apparatus 1500 may further include a fifth display unit, a second sending unit, a second receiving unit, and a sixth display unit.

The fifth display unit may be configured to display a face capture interface, in response to detecting a third trigger operation on the emoji generation trigger control.

The second sending unit may be configured to send a second generation request carrying the first face image to the server once the first face image is captured by the face capture interface, where the second generation request may be used to instruct the server to generate the third emoji image based on the first face image and the second emoji template image and send back the third emoji image.

The second receiving unit may be configured to receive the third emoji image fed-back by the server.

The sixth display unit may be configured to replace the first preview image with a second preview image, where the second preview image may be a preview image of the third emoji image.

In some embodiments of the present disclosure, the first preview image may include a first target text displayed in a predetermined text style;

Accordingly, in a case that the quantity of words of the input text is less than or equal to a predetermined quantity threshold, the first target text may include the input text; and in a case that the quantity of words of the input text is greater than the predetermined quantity threshold, the first target text may include a predetermined text.

In some embodiments of the present disclosure, the target entry icon may include any one of:
  a first entry image, where the first entry image may be an image randomly selected from the first preview images; and
  a second entry image, where the second entry image may be a preview image of a target emoji image which is of the same sentiment type as the input text.

In some embodiments of the present disclosure, the target entry icon may include a second target text displayed in a predetermined text style, and the second target text may include first predetermined quantity of words of the input text.

In some embodiments of the present disclosure, a third preview image may be displayed in the emoji recommendation panel, the third preview image may include the target entry icon and a preview image of a fourth emoji image, and the fourth emoji image may be a non-custom emoji image which is of the same sentiment type as the input text.

Accordingly, the image display apparatus 1500 may further include a display duration obtaining unit, a seventh display unit and an eighth display unit.

The display duration obtaining unit may be configured to obtain a display duration of the emoji recommendation panel.

The seventh display unit may be configured to stop displaying the emoji recommendation panel in a case that the display duration reaches a predetermined duration and the third preview image is not triggered.

The eighth display unit may be configured to display the target entry icon in the chat interface.

In some embodiments of the present disclosure, the image display apparatus 1500 may further include a ninth display unit, and the ninth display unit may be configured to stop displaying the target entry icon, in a case that the input text is not displayed in the chat interface.

It should be noted that the image display apparatus 1500 shown in FIG. 15 may perform the steps in the method embodiments shown in FIG. 3 to FIG. 14 and implement the processes and effects in the method embodiments shown in FIG. 3 to FIG. 14, which is not repeated herein.

An image display device is further provided according to an embodiment of the present disclosure. The image display device may include a processor and a memory, where the memory may be configured to store executable instructions. The processor may be configured to read the executable instructions from the memory and execute the executable instructions to implement the image display method in the above embodiments.

Figure 16:
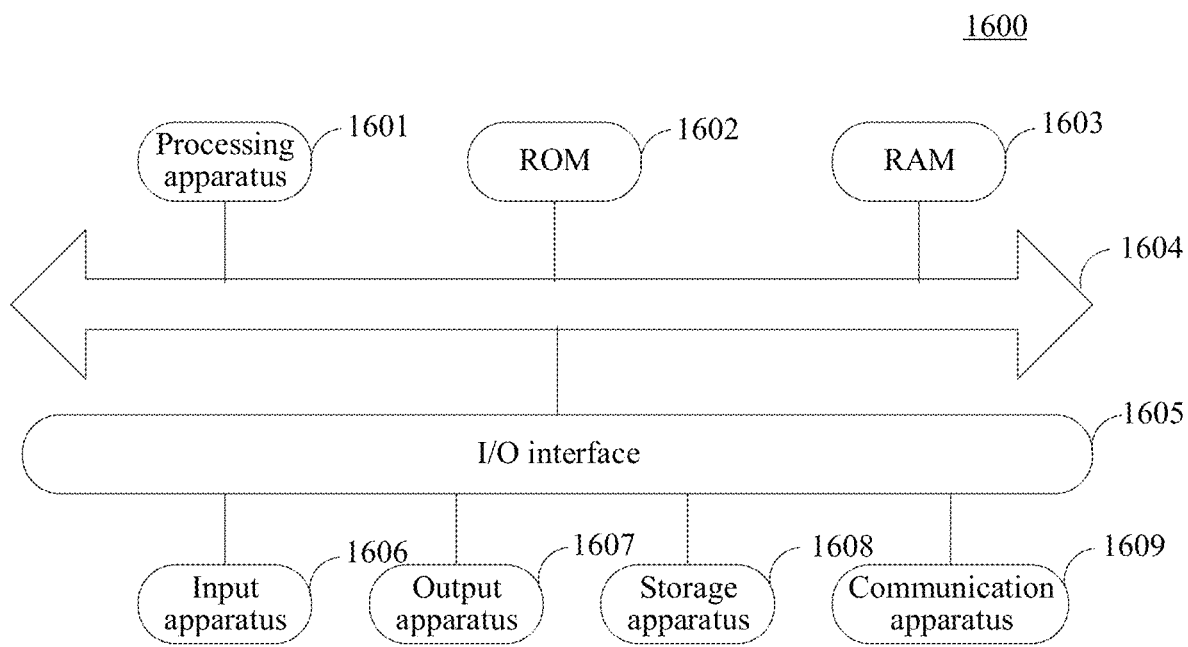
FIG. 16 is a schematic structural diagram of an image display device according to an embodiment of the present disclosure.

FIG. 16 illustrates a schematic structural diagram of an image display device according to an embodiment of the present disclosure. Specific reference is made to FIG. 16 hereinafter, which illustrates a schematic diagram of a structure suitable for implementing the image display device 1600 in the embodiments of the present disclosure.

The image display device 1600 in the embodiments of the present disclosure may be an electronic device. The electronic device may include, but is not limited to, mobile terminals such as a mobile phone, a notebook computer, a digital broadcast receiver, a PDA (personal digital assistant), a PAD (tablet computer), a PMP (portable multimedia player), a vehicle-mounted terminal (e.g., a vehicle-mounted navigation terminal), and a wearable device, and stationary terminals such as a digital TV, a desktop computer, and a smart home device.

In some embodiments, the electronic device may be the first electronic device 110 at client end as shown in FIG. 1 and FIG. 2.

It should be noted that the image display device 1600 illustrated in FIG. 16 is merely an example and should not impose any limitations on the functionality and scope of use of embodiments of the present disclosure.

As shown in FIG. 16, the image display device 1600 may include a processing apparatus (such as a central processor and a graphic processor) 1601. The processing apparatus may perform various appropriate actions and processing based on programs stored in a read-only memory (ROM) 1602 or programs uploaded from a storage apparatus 1608 to a random access memory (RAM) 1603. Various programs and data required for operations of the image display device 1600 are also stored in the RAM 1603. The processing apparatus 1601, the ROM 1602 and the RAM 1603 are connected to each other through the bus 1604. An input/output (I/O) interface 1605 is also connected to the bus 1604.

Generally, the following apparatuses may be connected to the I/O interface 1605: an input apparatus 1606 such as a touch screen, a touch panel, a keyboard, a mouse, a camera, a microphone, an accelerometer, and gyroscope; an output apparatus 1607 such as a liquid crystal display (LCD), a loudspeaker and a vibrator; a storage apparatus 1608 such as a magnetic tape and a hard disk; and a communication apparatus 1609. The communication apparatus 1609 may allow the image display device 1600 to communicate with other device in a wired or wireless manner to exchange data. Although FIG. 16 shows the image display device 1600 provided with various apparatuses, it should be understood that not all shown apparatuses are required to be implemented or included. Alternatively, more or less apparatuses may be implemented or included.

A computer readable storage medium having a computer program stored thereon is further provided according to an embodiment of the present disclosure. The computer program, when being executed by a processor, causes the processor to implement the image display method according to the foregoing embodiments.

Particularly, according to the embodiments of the present disclosure, the process described above in conjunction with flowcharts may be implemented as a computer software program.

A computer program product is further provided according to an embodiment of the present disclosure. The computer program product may include a computer program, the computer program, when being executed by a processor, causes the processor to implement the image display method according to the foregoing embodiments.

For example, a computer program product is further provided according to an embodiment of the present disclosure, including a computer program carried on a non-transitory computer readable medium. The computer program includes program code for performing the method shown in the flowchart. In the embodiment, the computer program may be downloaded and installed from the network via the communication apparatus 1609, or installed from the storage apparatus 1608, or installed from the ROM 1602. When the computer program is executed by the processing apparatus 1601, the functions defined in the image display method according to the embodiment of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be any tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any currently known network protocol such as Hyper Text Transfer Protocol (HTTP) or any network protocol to be developed in the further, and may connect with digital data communication (for example, a communication network) in any form or carried in any medium. Examples of the communication network include a local area network (LAN), a wide area network (WAN), Internet, and an end-to-end network (such as, ad hoc end-to-end network), and any currently known or future developed network.

The computer readable storage medium may be included in the image display device, or may stand alone without being assembled into the image display device.

The computer readable medium carries one or more programs. The one or more programs, when executed by the image display device, enable the image display device to perform the following operations:

displaying an emoji recommendation panel in a chat interface, once an input text displayed in the chat interface triggers an emoji recommendation event, where a target entry icon is displayed in the emoji recommendation panel, and the target entry icon is used to trigger the display of a custom target emoji image; stopping displaying the emoji recommendation panel, in response to detecting a first trigger operation on the target entry icon; and displaying, in the chat interface, a target emoji presentation panel corresponding to the target entry icon, where a first preview image is displayed in the target emoji presentation panel, and the first preview image is a preview image of the target emoji image.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include, but not limited to, a system, an apparatus or a device in an electric, magnetic, optical, electromagnetic, infrared or a semiconductor form, or any appropriate combination thereof. The machine readable storage medium may include, but not limited to, electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and actions described above are merely example forms of implementing the claims.

The invention claimed is:

1. An image display method, comprising:
displaying an emoji recommendation panel in a chat interface once an input text displayed in the chat interface triggers an emoji recommendation event, wherein a target entry icon is displayed in the emoji recommendation panel, and the target entry icon is used to trigger display of one or more custom target emoji images;
stopping displaying the emoji recommendation panel in response to detecting a first trigger operation on the target entry icon; and
displaying, in the chat interface, a target emoji presentation panel corresponding to the target entry icon, wherein one or more first preview images are displayed in the target emoji presentation panel, and each first preview image is a preview image of one target emoji image,
wherein the chat interface is an interface in which a first user performs a chat with a second user, the one or more target emoji images comprise a first emoji image, the first emoji image is generated based on a first face image of the first user and a second face image of the second user, and before the input text displayed in the chat interface triggers the emoji recommendation event, the image display method further comprises:
displaying target invitation information sent from the second user to the first user;
sending, to a server, a first generation request carrying a first user identifier of the first user and a second user identifier of the second user, in response to detecting a second triggering operation on the target invitation information, wherein the first generation request is used to instruct the server to generate the first emoji image based on the first face image stored in association with the first user identifier, the second face image stored in association with the second user identifier, and a first emoji template image; and
receiving the first emoji image fed-back by the server.

2. The image display method according to claim 1, wherein the target invitation information comprises any one of:
first invitation information, wherein the first invitation information is invitation information sent to the first user from the second user by triggering first invitation prompt information displayed in the chat interface; and
second invitation information, wherein the second invitation information is invitation information sent to the first user from the second user by triggering second invitation prompt information displayed in an emoji presentation panel for displaying a second emoji image, and the second emoji image is generated based on the second face image.

3. The image display method according to claim 1, wherein:
the target invitation information carries a target template identifier, and the target template identifier is a template identifier of an emoji template selected by the second user; and
the first generation request further carries the target template identifier, and the first emoji template image is an emoji template image corresponding to the target template identifier.

4. The image display method according to claim 1, wherein the chat interface is an interface in which a first user performs a chat with a second user; the method further comprises:
in response to detecting that there is no first emoji image generated based on a first face image of the first user and a second face image of the second user and detecting that there is a third emoji image generated based on the first face image, determining that the one or more target emoji images comprise the third emoji image.

5. The image display method according to claim 1, wherein the chat interface is an interface in which a first user performs a chat with a second user; the method further comprises:
in response to detecting that there is no third emoji image generated based on a first face image of the first user and a second emoji template image, determining that the one or more target emoji images comprise the second emoji template image.

6. The image display method according to claim 5, wherein an emoji generation trigger control is displayed in the target emoji presentation panel;
after displaying the target emoji presentation panel corresponding to the target entry icon, the image display method further comprises:
displaying a face capture interface in response to detecting a third trigger operation on the emoji generation trigger control;
sending a second generation request carrying the first face image to the server once the first face image is captured by the face capture interface, wherein the second generation request is used to instruct the server to generate the third emoji image based on the first face image and the second emoji template image;
receiving the third emoji image fed-back by the server; and
replacing one of the one or more first preview images with a second preview image, wherein the second preview image is a preview image of the third emoji image.

7. The image display method according to claim 1, wherein the one or more first preview images comprise a first target text displayed in a predetermined text style;
in a case that the quantity of words of the input text is less than or equal to a predetermined quantity threshold, the first target text comprises the input text; and
in a case that the quantity of words of the input text is greater than the predetermined quantity threshold, the first target text comprises a predetermined text.

8. The image display method according to claim 1, wherein the target entry icon comprises any one of:

a first entry image, wherein the first entry image is an image randomly selected from the one or more first preview images; and a second entry image, wherein the second entry image is a preview image of a target emoji image which is of a sentiment type same as that of the input text.

9. The image display method according to claim 1, wherein the target entry icon comprises a second target text displayed in a predetermined text style, and the second target text comprises first predetermined quantity of words of the input text.

10. The image display method according to claim 1, wherein a third preview image is displayed in the emoji recommendation panel, the third preview image comprises the target entry icon and a preview image of a fourth emoji image, and the fourth emoji image is a non-custom emoji image which is of a sentiment type same as that of the input text; wherein after displaying the emoji recommendation panel, the image display method further comprises:

obtaining a display duration of the emoji recommendation panel;

stopping displaying the emoji recommendation panel, in a case that the display duration reaches a predetermined duration and the third preview image is not triggered; and displaying the target entry icon in the chat interface.

11. The image display method according to claim 10, wherein after displaying the target entry icon, the image display method further comprises:

stopping displaying the target entry icon in a case that the input text is not displayed in the chat interface.

12. An image display device, comprising:

a processor; and a memory configured to store executable instructions;

wherein the processor is configured to read the executable instructions from the memory, and execute the executable instructions to implement:

displaying an emoji recommendation panel in a chat interface once an input text displayed in the chat interface triggers an emoji recommendation event, wherein a target entry icon is displayed in the emoji recommendation panel, and the target entry icon is used to trigger display of one or more custom target emoji images;

stopping displaying the emoji recommendation panel in response to detecting a first trigger operation on the target entry icon; and displaying, in the chat interface, a target emoji presentation panel corresponding to the target entry icon, wherein one or more first preview images are displayed in the target emoji presentation panel, and each first preview image is a preview image of one target emoji image, wherein the chat interface is an interface in which a first user performs a chat with a second user, the one or more target emoji images comprise a first emoji image, the first emoji image is generated based on a first face image of the first user and a second face image of the second user, and the processor is further configured to implement:

displaying target invitation information sent from the second user to the first user;

sending, to a server, a first generation request carrying a first user identifier of the first user and a second user identifier of the second user, in response to detecting a second triggering operation on the target invitation information, wherein the first generation request is used to instruct the server to generate the first emoji image based on the first face image stored in association with the first user identifier, the second face image stored in association with the second user identifier, and a first emoji template image; and receiving the first emoji image fed-back by the server.

13. The image display device according to claim 12, wherein the target invitation information comprises any one of:

first invitation information, wherein the first invitation information is invitation information sent to the first user from the second user by triggering first invitation prompt information displayed in the chat interface; and second invitation information, wherein the second invitation information is invitation information sent to the first user from the second user by triggering second invitation prompt information displayed in an emoji presentation panel for displaying a second emoji image, and the second emoji image is generated based on the second face image.

14. The image display device according to claim 12, wherein:

the target invitation information carries a target template identifier, and the target template identifier is a template identifier of an emoji template selected by the second user; and the first generation request further carries the target template identifier, and the first emoji template image is an emoji template image corresponding to the target template identifier.

15. The image display device according to claim 12, wherein the chat interface is an interface in which a first user performs a chat with a second user; wherein the processor is further configured to implement:

in response to detecting that there is no first emoji image generated based on a first face image of the first user and a second face image of the second user and detecting that there is a third emoji image generated based on the first face image, determining that the one or more target emoji images comprise the third emoji image.

16. A non-transitory computer-readable storage medium having a computer program stored thereon, wherein the computer program, when being executed by a processor, causes the processor to implement:

displaying an emoji recommendation panel in a chat interface once an input text displayed in the chat interface triggers an emoji recommendation event, wherein a target entry icon is displayed in the emoji recommendation panel, and the target entry icon is used to trigger display of one or more custom target emoji images;

stopping displaying the emoji recommendation panel in response to detecting a first trigger operation on the target entry icon; and in response to detecting the first trigger operation on the target entry icon, displaying, in the chat interface, a target emoji presentation panel corresponding to the target entry icon, wherein one or more first preview images are displayed in the target emoji presentation panel, and each first preview image is a preview image of one target emoji image, wherein the chat interface is an interface in which a first user performs a chat with a second user, the one or more target emoji images comprise a first emoji image, the first emoji image is generated based on a first face image of the first user and a second face image of the second user, and the computer program further causes the processor to implement:

displaying target invitation information sent from the second user to the first user;

sending, to a server, a first generation request carrying a first user identifier of the first user and a second user identifier of the second user, in response to detecting a second triggering operation on the target invitation information, wherein the first generation request is used to instruct the server to generate the first emoji image based on the first face image stored in association with the first user identifier, the second face image stored in association with the second user identifier, and a first emoji template image; and receiving the first emoji image fed-back by the server.

* * * * *